United States Patent [19]

Gosselink et al.

[11] Patent Number: 4,711,730
[45] Date of Patent: Dec. 8, 1987

[54] CAPPED 1,2-PROPYLENE TEREPHTHALATE-POLYOXYETHYLENE TEREPHTHALATE POLYESTERS USEFUL AS SOIL RELEASE AGENTS

[75] Inventors: Eugene P. Gosselink, Cincinnati; Francis L. Diehl, Wyoming, both of Ohio

[73] Assignee: The Procter & Gamble Company, Cincinnati, Ohio

[21] Appl. No.: 852,257

[22] Filed: Apr. 15, 1986

[51] Int. Cl.⁴ .................. C11D 17/00; D06M 9/00; C07C 69/76

[52] U.S. Cl. ........................ 252/8.75; 252/88; 252/174.23; 252/174.21; 252/174.22; 252/DIG. 2; 252/DIG. 15; 560/91; 428/279

[58] Field of Search .............. 560/91; 252/174.23, 252/174.21, 174.22, DIG. 2, DIG. 15, 8.75, 8.8; 428/279

[56] References Cited

U.S. PATENT DOCUMENTS

| | | | |
|---|---|---|---|
| 3,416,952 | 12/1968 | McIntyre et al. | 117/118 |
| 3,512,920 | 5/1970 | Dunlap | 8/115.7 |
| 3,712,873 | 1/1973 | Zenk | 252/174.23 |
| 3,893,929 | 7/1975 | Basadur | 252/8.6 |
| 3,959,230 | 5/1976 | Hays | 252/8.6 |
| 3,962,152 | 6/1976 | Nicol et al. | 252/DIG. 15 |
| 4,116,885 | 9/1978 | Derstadt et al. | 252/532 |
| 4,132,680 | 1/1979 | Nicol | 252/547 |
| 4,238,531 | 12/1980 | Rudy et al. | 252/8.8 |
| 4,411,831 | 10/1983 | Robinson et al. | 252/DIG. 15 |
| 4,427,557 | 1/1984 | Stockburger | 252/8.7 |
| 4,597,898 | 7/1986 | Vander Meer | 252/174.23 |
| 4,664,848 | 5/1987 | Oh et al. | 252/174.23 |

FOREIGN PATENT DOCUMENTS

| | | |
|---|---|---|
| 1100262 | 5/1981 | Canada . |
| 1088984 | 10/1967 | United Kingdom . |
| 2137652 | 10/1984 | United Kingdom . |
| 2137221 | 10/1984 | United Kingdom . |

Primary Examiner—Josephine L. Barr
Attorney, Agent, or Firm—Eric W. Guttag; Jerry J. Yetter; Steven J. Goldstein

[57] ABSTRACT

Capped 1,2-propylene terephthalate-polyoxyethylene terephthalate polyesters useful as soil release agents are disclosed. Preferred polyesters have the formula:

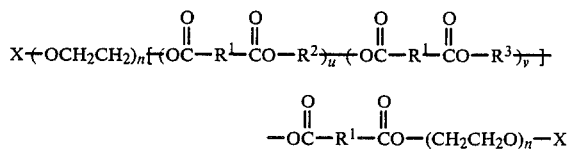

wherein each $R^1$ is a 1,4-phenylene moiety; the $R^2$ are essentially 1,2-propylene moieties; the $R^3$ are essentially the polyoxyethylene moiety—$(CH_2CH_2O)_q$—$CH_2CH_2$—; each X is ethyl or preferably methyl; each n is from about 12 to about 45; q is from about 12 to about 90; the average value of u is from about 5 to about 20; the average value of v is from about 1 to about 10; the average value of u+v is from about 6 to about 30; the ratio u to v is from about 1 to about 6.

33 Claims, No Drawings

CAPPED 1,2-PROPYLENE TEREPHTHALATE-POLYOXYETHYLENE TEREPHTHALATE POLYESTERS USEFUL AS SOIL RELEASE AGENTS

TECHNICAL FIELD

The present application relates to capped 1,2-propylene terephthalate-polyoxyethylene terephthalate polyesters and analogous compounds useful as soil release agents in rinse-added and dryer-added fabric conditioning products and in certain laundry detergent products.

Products used in laundering operation contain a number of ingredients which provide certain basic benefits. For example, laundry cleaning products are formulated with detergent surfactant systems to remove a variety of soils from clothes during washing. These laundry products can also include ingredients which provide through-the-wash fabric conditioning benefits such as softening and anti-static performance. More typically, softening and anti-static benefits are provided by other fabric treatment products. These other fabric treatment products are added as part of the rinse cycle or else in the dryer to provide the conditioning benefit.

In addition to standard cleaning, softening and anti-static benefits, laundry detergent and fabric conditioning products can also impart other desirable properties. One is the ability to confer soil release properties to fabrics woven from polyester fibers. These fabrics are mostly co-polymers of ethylene glycol and terephthalic acid, and are sold under a number of trade names, e.g., Dacron, Fortrel, Kodel and Blue C Polyester. The hydrophobic character of polyester fabrics makes their laundering difficult, particularly as regards oily soil and oily stains. The oily soil or stain preferentially "wets" the fabric. As a result, the oily soil or stain is difficult to remove in an aqueous laundering process.

Polyesters containing random ethylene terephthalate/polyethylene glycol (PEG) terephthalate units, such as MILEASE T, have been used as soil release compounds in laundry detergent products. See for example, U.S. Pat. No. 4,116,885 to Derstadt et al., issued September, 1978. During the laundering operation, these soil release polyesters adsorb onto the surface of fabrics immersed in the wash solution. The adsorbed polyester then forms a hydrophilic film which remains on the fabric after it is removed from the wash solution and dried. This film can be renewed by subsequent washing of the fabric with a detergent composition containing the soil release polyesters. Similar soil release polyesters have also been used in rinse-added and dryer-added fabric conditioning products. See Canadian Pat. No. 1,100,262 to Becker et al., issued May 5, 1981 (rinse-added products containing soil release polyesters such as PERMALOSE or ZELCON); U.S. Pat. No. 4,238,531 to Rudy et al., issued Dec. 9, 1980 (dryer-added products containing PERMALOSE TG soil release polyesters).

The development of new soil release agents having superior performance to these prior art polyesters is not straightforward. To be useful, the soil release agent needs to be efficiently adsorbed from the particular product matrix onto the fabric being treated. The soil release agent should also not interfere with the ability of other ingredients in the product to provide cleaning, softening and/or anti-static benefits. For liquid products, especially liquid laundry detergent products, the soil release agent needs to be sufficiently soluble or dispersible so that it can be formulated into the product. Moreover, a soil release agent which satisfies these criteria for various product usages, i.e., laundry detergent, rinse-added, dryer-added, would be highly desirable.

BACKGROUND ART

A. Ethylene terephthalate/PEG terephthalate soil release polyesters used in laundry detergent compositions U.S. Pat. No. 4,116,885 to Derstadt et al., issued Sept. 26, 1978, discloses laundry detergent compositions containing 0.15 to 25% (most preferably 0.5 to 10%) of an ethylene terephthalate/PEG terephthalate soil release polyester, such as MILEASE T, having an average molecular weight of 5000 to 200,000 (preferably 10,000 to 50,000). These detergent compositions further contain 5 to 95% (most preferably 10 to 25%) of certain compatible alcohol sulfate and alkylethoxy sulfate detergent surfactants and no more than 10% of other incompatible anionic surfactants such as the linear alkyl benzene sulfonates.

U.S. Pat. No. 4,132,680 to Nicol issued Jan. 2, 1979, also discloses laundry detergent compositions having soil release properties which contain 2 to 95% (preferably 10 to 60%) of a detergent surfactant and 0.15 to 25% (most preferably 1 to 10%) of an ethylene terephthalate/PEG terephthalate (mole ratio of 65:35 to 80:20) soil release polyester having a molecular weight of 10,000 to 50,000, e.g. MILEASE T. These compositions further comprise 0.05 to 15% (most preferably 0.1 to 5%) of a component which disassociates in aqueous solution to yield quaternary ammonium cations having one to three $C_8$–$C_{24}$ alkyl groups. These cations are taught by Nicol to improve the deposition of the soil release polyester on the laundered fabric. See column 11, lines 14–21.

B. Use of polyesters in rinse-added products to impart soil release properties Canadian Pat. No. 1,100,262 to Becker et al. issued May 5, 1981, discloses fabric softener compositions containing 1 to 80% (preferably 5 to 50%) of a fabric-softening agent such as ditallow dimethyl ammonium chloride in combination with 0.5 to 25% (preferably 1 to 10%) of certain choline fatty acid esters. These softening compositions preferably include 0.5 to 10% (preferably 1 to 5%) of an ethylene terephthalate/PEG terephthalate soil release polyester such as PERMALOSE or ZELCON.

U.S. Pat. No. 3,893,929 to Basadur issued July 8, 1975, discloses rinse-added acidic solutions containing a soil release agent made from a dibasic carboxylic acid (preferably terephthalic acid), a polyalkylene glycol (preferably a PEG having a molecular weight of 1,300 to 1,800) and an alkylene glycol (ethylene, propylene or butylene glycol). Preferred soil release agents have a molecular weight of from 3,000 to 5,000. Cationic fabric softeners such as ditallow dimethyl ammonium chloride can be included in these compositions, but are not preferred "since they tend to retard the deposition of the soil release agent on the polyester fibers at acidic pH." See column 7, lines 54–59.

U.S. Pat. No. 3,712,873 to Zenk issued Jan. 23, 1973, discloses textile treating compositions applied by spraying or padding which comprise 1 to 5% of a fatty alcohol polyethoxylate and 0.1 to 5% of a soil release polyester of the type disclosed in the Basadur patent. These compositions can additionally contain up to 4% of a quaternary ammonium compound having one $C_{16}-C_{22}$ alkyl group. The combination of this quaternary ammonium compound with the polyester is described as improving the soil-release characteristic of the treated fabric. Zenk also states that other quaternary ammonium compounds, such as ditallow dimethyl ammonium chloride, did not give the same superior performance. See column 3, lines 57-61.

C. Use of polyesters in dryer-added products to impart soil release properties U.S. Pat. No. 4,238,531 to Rudy et al. issued Dec. 9, 1980, discloses dryer-added products which contain a "distributing agent" such as polyethylene glycol and an adjuvant applied to the fabric which can be a soil release agent. Soil release agents disclosed include polyacrylic resins, polyvinyl alcohol and PERMALOSE TG polyesters (see Example 8).

D. Use of polyesters in fabric or textile treating solutions which are heat cured to impart soil release and/or anti-static properties U.S. Pat. No. 3,512,920 to Dunlap issued May 9, 1970, discloses low molecular weight alkylene gylcol/polyalkylene glycol terephthalic acid polyesters which are used in resin treating baths containing starch or cellulose derivatives to impart soil release properties to cotton/polyester fabrics after heat curing. The alkylene glycols which can be used to make these polyesters include ethylene glycol, 1,2-propylene glycol, 1,3-propylene glycol, butylene glycol and mixtures thereof. The polyalkylene glycols whch can be used include PEG, polybutylene glycol and mixtures thereof which have an average molecular weight of 200 to 20,000 (preferably 1,000 to 5,000).

U.S. Pat. No. 3,416,952 to McIntyre et al. issued Dec. 17, 1968, discloses polyester anti-static agents which can contain a water-solvatable polymeric group such as a polyoxyalkylene group having an average molecular weight of from 300 to 6,000. Preferred polyoxyalkylene groups are the PEG's having an average molecular weight of from 1,000 to 4,000. Treatment is carried out by applying an aqueous dispersion of the polyester in the presence of an anti-oxidant, followed by heating to a temperature above 90° C. to obtain a durable coating of the polyester on the treated article. Example 6 discloses one such polyester formed by the catalyzed reaction of dimethyl terephthalate, ethylene glycol and an O-methyl poly(oxyethylene)glycol having an average molecular weight of 350. A 20% solution of this polyester in benzyl alcohol was used to impart anti-static properties to a polyester fabric. Example 7 discloses a 20% aqueous solution of a similar polyester used to impart anti-static properties to a polyester fabric.

U.S. Pat. No. 4,427,557 to Stockburger issued Jan. 24, 1984, discloses low molecular weight copolyesters (2,000 to 10,000) formed by the reaction of ethylene glycol, a PEG having a average molecular weight of 200 to 1,000, an aromatic dicarboxylic acid (e.g., dimethyl terephthalate), and a sulfonated aromatic dicarboxylic acid (e.g., dimethyl 5-sulfoisophthalate). The PEG can be replaced, in part, with monoalkylethers of PEG such as the methyl, ethyl and butyl ethers. A dispersion or solution of the copolyester is applied to the textile material and then heat set at elevated temperatures (90° to 150° C.) to impart durable soil release properties. See also the McIntyre et al. patent, where Example 2 discloses a random copolyester used to impart anti-static properties which is formed by reacting dimethyl terephthalate, sodium dimethyl sulfoisophthalate, ethylene glycol and a PEG having an average molecular weight of 1540.

DISCLOSURE OF THE INVENTION

The present invention relates to compounds of formula:

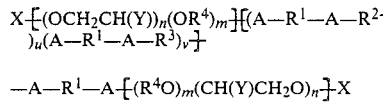

$$-A-R^1-A-\{(R^4O)_m(CH(Y)CH_2O)_n\}-X$$

wherein the A moieties are essentially

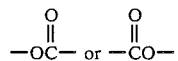

moieties; the $R^1$ moieties are essentially 1,4-phenylene moieties; the $R^2$ moieties are essentially substituted ethylene moieties having $C_1-C_4$ alkyl or alkoxy substituents; the $R^3$ moieties are essentially the polyoxyethylene moiety $-(CH_2CH_2O)_q-CH_2CH_2-$; each $R^4$ is $C_3-C_4$ alkylene, or the moiety $-R^2-A-R^5-$, wherein $R^5$ is a $C_1-C_{12}$ alkylene, alkenylene, arylene or alkarylene moiety; the Y substituents of each moiety $\{(R^4O)_m(CH(Y)CH_2O)_n\}$ are H, the ether moiety $-CH_2(OCH_2CH_2)_pO-X$ or a mixture of this ether moiety and H; each X is H, $C_1-C_4$ alkyl or

wherein $R^6$ is $C_1-C_4$ alkyl; m and n are numbers such that the moiety $-(CH(Y)CH_2O)-$ comprises at least about 50% by weight of the moiety $\{(R^5O)_m(CH(Y)CH_2O)_n\}$, provided that when $R^4$ is the moiety $-R^2-A-R^5-$, m is 1; each n is at least about 6; p is 0 or at least 1; q is at least about 9; the average value of u is from about 2 to about 50; the average value of v is from about 1 to about 20; the average value of u+v is from about 3 to about 70.

The compounds of the present invention are useful as soil release agents in certain laundry detergent compositions. These laundry compositions comprise:
(a) from about 5 to about 75% by weight of a nonionic detergent surfactant;
(b) from 0 to about 15% by weight synthetic anionic detergent surfactants; and
(c) a soil release component having an effective amount of the compounds of the present invention.

The compounds of the present invention are also useful as soil release agents in rinse-added, aqueous fabric softener compositions. These fabric softener compositions comprise:
(a) from about 2 to about 50% by weight of a fabric softener component; and
(b) a soil release component having an effective amount of the compounds of the present invention.

The compounds of the present invention are further useful in articles which provide fabric soil release and softening benefits when used within an automatic clothes dryer. These articles comprise:

(a) a fabric conditioning component having a melting point above about 38° C. and being flowable at dryer operating temperatures and which comprises:
  (i) from about 1 to about 70% of the compounds of the present invention; and
  (ii) from about 30 to about 99% of a fabric softening agent selected from the group consisting of cationic fabric softener compounds, nonionic fabric softener compounds and mixtures thereof;
(b) the fabric conditioning component being associated with a dispensing means which provides for release thereof within an automatic clothes dryer at dryer operating temperatures.

SOIL RELEASE COMPOUNDS

The compounds of the present invention have the formula:

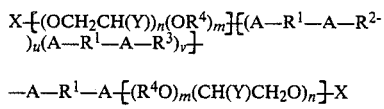

$$-A-R^1-A-[(R^4O)_m(CH(Y)CH_2O)_n]-X$$

In this formula, the moiety $-[(A-R^1-A-R^2)_u(A-R^1-A-R^3)_v]-A-R^1-A-$ forms the oligomer or polymer backbone of the compounds. Groups $X-[(OCH_2CH(Y))_n(OR^4)_m]-$ and $-[(R^4O)_m(CH(Y)CH_2O)_n]-X$ are generally connected at the ends of the oligomer/polymer backbone.

The linking A moieties are essentially

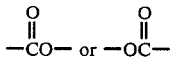

moieties, i.e. the compounds of the present invention are polyesters. As used herein, the term "the A moieties are essentially

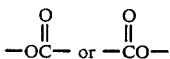

moieties" refers to compounds where the A moieties consist entirely of moieties

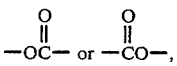

or are partially substituted with linking moieties such as

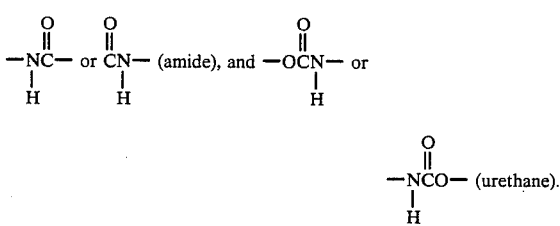

The degree of partial substitution with these other linking moieties should be such that the soil release properties are not adversely affected to any great extent. Preferably, linking moieties A consist entirely of (i.e., comprise 100%) moieties

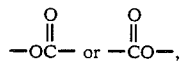

i.e., each A is either

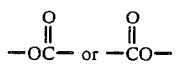

The $R^1$ moieties are essentially 1,4-phenylene moieties. As used herein, the term "the $R^1$ moieties are essentially 1,4-phenylene moieties" refers to compounds where the $R^1$ moieties consist entirely of 1,4-phenylene moieties, or are partially substituted with other arylene or alkarylene moieties, alkylene moieties, alkenylene moieties, or mixtures thereof. Arylene and alkarylene moieties which can be partially substituted for 1,4-phenylene include 1,3-phenylene, 1,2-phenylene, 1,8-naphthylene, 1,4-naphthylene, 2,2'-biphenylene, 4,4'-biphenylene and mixtures thereof. Alkylene and alkenylene moieties which can be partially substituted include ethylene, 1,2-propylene, 1,4-butylene, 1,5-pentylene, 1,6-hexamethylene, 1,7-heptamethylene, 1,8-octamethylene, 1,4-cyclohexylene, and mixtures thereof.

These other arylene, alkarylene, alkylene and alkenylene moieties can be unsubstituted or can have at least one $-SO_3M$, $-COOM$ or $-A-R^7-[A-R^1-A-R^7-O]_wX$ substituent or at least one moiety $-A-R^7-[A-R^1-A-R^7]_wA-$ cross-linked to another $R^1$ moiety, wherein $R^7$ is the moiety $R^2$ or $R^3$; and w is 0 or st least 1. Preferably, these substituted $R^1$ moieties have only one $-SO_3M$, $-COOM$ or $-A-R^7-[A-R^1-A-R^7-O]_wX$ substituent. M can be H or any compatible water-soluble cation. Suitable water-soluble cations include the water-soluble alkaki metals such as potassium ($K^+$) and especially sodium ($Na^+$), as well as ammonium ($NH_4^+$). Also suitable are substituted ammonium cations having the formula:

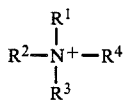

where $R^1$ and $R^2$ are each a $C_1$-$C_{20}$ hydrocarbyl group (e.g. alkyl, hydroxyalkyl) or together from a cyclic or heterocyclic ring of from 4 to 6 carbon atoms (e.g. piperidine, morpholine); $R^3$ is a $C_1$-$C_{20}$ hydrocarbyl group; and $R^4$ is H (ammonium) or a $C_1$-$C_{20}$ hydrocarbyl group (quat amine). Typical substituted ammonium cationic groups are those where $R^4$ is H (ammonium) or $C_1$-$C_4$ alkyl, especially methyl (quat amine); $R^1$ is $C_{10}$-$C_{18}$ alkyl, especially $C_{12}$-$C_{14}$ alkyl; and $R^2$ and $R^3$ are each $C_1$-$C_4$ alkyl, especially methyl.

The $R^1$ moieties having $-A-R^7-[A-R^1-A-R^7-O]_wX$ substituents provide branched backbone compounds. The $R^1$ moieties having $-A-R^7-[A-R^1-A-R^7]_wA-$ moieties provide cross-linked backbone compounds. Indeed, syntheses used to make the branched backbone compounds typically provide at least some cross-linked backbone compounds.

For the $R^1$ moieties, the degree of partial substitution with moieties other than 1,4-phenylene should be such that the soil release properties of the compound are not adversely affected to any great extent. Generally, the degree of partial substitution which can be tolerated will depend upon the backbone length of the compound, i.e., longer backbones can have greater partial substitution for 1,4-phenylene moieties. Usually, compounds where the $R^1$ comprise from about 50 to 100% 1,4-phenylene moieties (from 0 to about 50% moieties other than 1,4-phenylene) have adequate soil release activity. However, because most polyesters used in fiber making comprise ethylene terephthalate units, it is usually desirable to minimize the degree of partial substitution with moieties other than 1,4-phenylene for best soil release activity. Preferably, the $R^1$ moieties consist entirely of (i.e., comprise 100%) 1,4-phenylene moieties, i.e. each $R^1$ moiety is 1,4-phenylene.

The $R^2$ moieties are essentially substituted ethylene moieties having $C_1$–$C_4$ alkyl or alkoxy substitutents. As used herein, the term "the $R^2$ moieties are essentially substituted ethylene moieties having $C_1$–$C_4$ alkyl or alkoxy substituents" refers to compounds of the present invention where the $R^2$ moieties consist entirely of substituted ethylene moieties, or are partially replaced with other compatible moieties. Examples of these other moieties include linear $C_2$–$C_6$ alkylene moieties such as ethylene, 1,3-propylene, 1,4-butylene, 1,5-pentylene or 1,6-hexamethylene, 1,2-cycloalkylene moieties such as 1,2-cyclohexylene, 1,4-cycloalkylene moieties such as 1,4-cyclohexylene and 1,4-dimethylene-cyclohexylene, polyoxyalkylated 1,2-hydroxyalkylenes such as

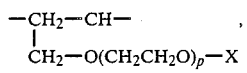

and oxyalkylene moieties such as —$CH_2CH_2OCH_2CH_2$—.

For the $R^2$ moieties, the degree of partial replacement with these other moieties should be such that the soil release and solubility properties of the compounds are not adversely affected to any great extent. Generally, the degree of partial replacement which can be tolerated will depend upon the soil release and solubility properties desired, the backbone length of the compound, (i.e., longer backbones generally can have greater partial replacement), and the type of moiety involved (e.g., greater partial substitution with ethylene moieties generally decreases solubility). Usually, compounds where the $R^2$ comprise from about 20 to 100% substituted ethylene moieties (from 0 to about 80% other compatible moieties) have adequate soil release activity. However, it is generally desirable to minimize such partial replacement for best soil release activity and solubility properties. (During the making of polyesters according to the present invention, small amounts of oxyalkylene moieties (as dialkylene glycols) can be formed from glycols in side reactions and then incorporated into the polyester). Preferably, $R^2$ comprises from about 80 to 100% substituted ethylene moieties, and from 0 to about 20% other compatible moieties. For the $R^2$ moieties, suitable substituted ethylene moieties include 1,2-propylene, 1,2-butylene, 3-methoxy-1,2-propylene and mixtures thereof. Preferably, the $R^2$ moieties are essentially 1,2-propylene moieties.

The $R^3$ moieties are essentially the polyoxyethylene moiety —$(CH_2CH_2O)_q$—$CH_2CH_2$13. As used herein, the term "the $R^3$ moieties are essentially the polyoxyethylene moiety —$(CH_2CH_2O)_q$—$CH_2CH_2$—" refers to compounds of the present invention in which the $R^3$ moieties consist entirely of this polyoxyethylene moiety, or further include other compatible moieties. Examples of these other moieties include $C_3$–$C_6$ oxyalkylene moieties such as oxypropylene and oxybutylene, polyoxyalkylene moieties such as polyoxypropylene and polyoxybutylene, and polyoxyalkylated 1,2-hydroxyalkylene oxides such as

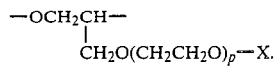

The degree of inclusion of these other moieties should be such that the soil release properties of the compounds are not adversely affected to any great extent. Usually, in compounds of the present invention, the polyoxyethylene moiety comprises from about 50 to 100% of each $R^3$ moiety. Preferably, the polyoxyethylene moiety comprises from about 90 to 100% of each $R^3$ moiety. (During the making of polyesters according to the present invention, very small amounts of oxyalkylene moieties may be attached to the polyoxyethylene moiety in side reactions and thus incorporated into the $R^3$ moieties).

For the polyoxyethylene moiety, the value for q is at least about 9, and is preferably at least about 12. The value for q usually ranges from about 12 to about 180. Typically, the value for q is in the range of from about 12 to about 90.

The moieties —$(R^4O)$— and —$(CH(Y)CH_2O)$— of the moieties $\{(R^4O)_m(CH(Y)CH_2O)_n\}$ and $\{(OCH(Y)CH_2)_n(OR^4)_m\}$ can be mixed together or preferably form blocks of —$(R^4O)$— and —$(CH(Y)CH_2O)$— moieties. Preferably, the blocks of —$(R^4O)$— moieties are located next to the backbone of the compound. When $R^4$ is the moiety —$R^2$—A—$R^5$—, m is 1; also, the moiety —$R^2$—A—$R^5$— is preferably located next to the backbone of the compound. For $R^4$, the preferred $C_3$–$C_4$ alkylene is $C_3H_6$ (propylene); when $R^4$ is $C_3$–$C_4$ alkylene, m is preferably from 0 to about 10 and is most preferably 0. $R^5$ is preferably methylene or 1,4-phenylene. The moiety —$(CH(Y)CH_2O)$— preferably comprises at least about 75% by weight of the moiety $\{(R^4O)_m(CH(Y)CH_2O)_n\}$ and most preferably 100% by weight (m is 0).

The Y substituents of each moiety $[(R^5O)_m(CH(Y)CH_2O)_n]$ are H, the ether moiety —$CH_2(OCH_2CH_2)_pO$—X, or a mixture of this ether moiety and H; p can range from 0 to 100, but is typically 0. Typically, the Y substituents are all H. When the Y substituents are a mixture of the ether moiety and H, the moiety —$(CH(Y)CH_2O)_n$— can be represented by the following moiety:

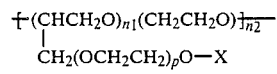

wherein $n_1$ is at least 1 and the sum of $n_1+n_2$ is the value for n. Typically, $n_1$ has an average value of from about 1 to about 10. The moieties

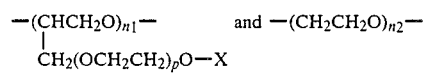

and —$(CH_2CH_2O)_{n2}$— can be mixed together, but typically form blocks of

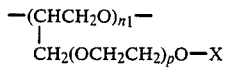

and —$(CH_2CH_2O)_{n2}$— moieties. X can be H, $C_1$-$C_4$ alkyl or

wherein $R^7$ is $C_1$-$C_4$ alkyl. X is preferably methyl or ethyl, and most preferably methyl. The value for each n is at least about 6, but is preferably at least about 10. The value for each n usually ranges from about 12 to about 113. Typically, the value for each n is in the range of from about 12 to about 45.

The backbone moieties —(A—R¹—A—R²)— and —(A—R¹—A—R³)— can form blocks of —(A—R¹—A—R²)— and —(A—R¹—A—R³)— moieties but are more typically randomly mixed together. For these backbone moieties, the average value of u can range from about 2 to about 50; the average value of v can range from about 1 to about 20; and the average value of u+v can range from about 3 to about 70. The average values for u, v and u+v are generally determined by the process by which the compound is made. Generally, the larger the average value for v or the smaller the average for u+v, the more soluble is the compound. Typically, the average value for u is from about 5 to about 20; the average value for v is from about 1 to about 10; and the average value for u+v is from about 6 to about 30. Generally, the ratio of u to v is at least about 1 and is typically from about 1 to about 6.

Preferred compounds of the present invention are polyesters having the formula:

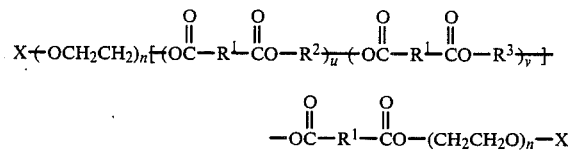

wherein each $R^1$ is a 1,4-phenylene moiety; the $R^2$ are essentially 1,2-propylene moieties; the $R^3$ are essentially the polyoxyethylene moiety —$(CH_2CH_2O)_q$—$CH_2CH_2$—; each X is ethyl or preferably methyl; each n is from about 12 to about 45; q is from about 12 to about 90; the average value of u is from about 5 to about 20; the average value of v is from about 1 to about 10; the average value of u+v is from about 6 to about 30; the ratio u to v is from about 1 to about 6.

METHOD FOR MAKING COMPOUNDS

The compounds of the present invention can be prepared by art-recognized methods. Although the following synthesis description is for the preferred polyesters of the present invention, other verisons can be prepared by appropriate variation.

The polyesters of the present invention are typically formed from: (1) 1,2-propylene glycol; (2) a polyethylene glycol (PEG) (3) a dicarboxylic acid (or preferably its diester); and (4) a PEG capped at one end with a $C_1$-$C_4$ alkyl group (or its reaction product with a glycidyl ether). The respective amounts of these four components are selected to prepare polyesters having the desired properties in terms of solubility and soil release properties.

The PEG used to prepare polyesters of the present invention can be formed by ethoxylation of ethylene glycol. Also, PEGs are commercially available from Union Carbide (under the trade name Carbowax) and from Aldrich Chemical Company. These commercial PEGs have molecular weights of 600 (q=about 12), 1000 (q=about 21), 1500 (q=about 33), 3400 (q=about 76), and 4000 (q=about 90).

Preferably, the only dicarboxylic acid used is terephthalic acid or its diester. However, minor amounts of other aromatic dicarboxylic acids (or their diesters), or aliphatic dicarboxylic acids (or their diesters) can be included to the extent that the soil release properties are substantially maintained. Illustrative examples of other aromatic dicarboxylic acids which can be used include isophthalic acid, phthalic acid, naphthalene dicarboxylic acids, anthracene dicarboxylic acids, biphenyl dicarboxylic acids, biphenyl dicarboxylic acids, oxydibenzoic acids and the like, as well as mixtures of these acids. If aliphatic dicarboxylic acids are included, adipic, glutaric, succinic, trimethyladipic, pimelic, azelaic, sebacic, suberic, 1,4-cyclohexane dicarboxylic acid and/or dodecanedioic acids can be used.

These other aromatic dicarboxylic acids can also include sulfonated aromatic dicarboxylic acids. Illustrative examples of sulfonated aromatic dicarboxylic acids which can be used to prepare polyesters of the present invention include the alkyl metal salts of benzene-2,5-dicarboxy sulfonate, 2-naphthyldicarboxy-benzene sulfonate, 1-naphthyl-dicarboxy-benzene sulfonate, phenyl-dicarboxy benzene sulfonate, 2,6-dimethyl phenyl-3,5-dicarboxy benzene sulfonate and phenyl-3,5-dicarboxy-benzene sulfonate. The preferred sulfonated salt is 5-sulfoisophthalic acid sodium salt or its diester. If branched backbone polyesters are desired, a minor amount of a polycarboxylic acid (or its diester) selected from trimesic acid, trimellitic acid, hemimellitic acid, pyromellitic acid, and mixtures thereof can be used.

The capped PEG used to prepare the polyesters of the present invention is typically methyl capped and can be formed by ethoxylation of the respective alcohol with ethylene oxide. Also, methyl capped PEGs are commercially available from Union Carbide under the trade name Methoxy Carbowax and from Aldrich Chemical Company under the name poly(ethylene glycol)methyl ether. These commercial methyl capped PEGs have molecular weights of 350 (n=about 7.5), 550 (n=about 12), 750 (n=about 16), 2000 (n=about 45), and 5000 (n=about 113).

If desired, the capped PEG, or more typically its alkali metal (Na+ or K+) alkoxide, can be reacted with a glycidyl ether to form a capped PEG having portions which are branched. See Flores-Gallardo et al., "Epoxy Ethers and Ether Amino Alcohols", *J. Org. Chem.*, Vol. 12, (1947), pp 831-33, which describes a method for preparing glycidyl ethers useful in the present invention. A representative synthesis of one such capped PEG is as follows:

STEP 1

1-methoxy-2-hydroxy-3-chloropropane

Into a 2-l., three-necked, round bottom flask, fitted with a condenser, addition funnel, and magnetic stirrer were placed 730 ml (18 moles) of methanol and 16.0 ml (0.25 moles) of methanesulfonic acid. To this refluxing mixture was added dropwise 496 ml (6.0 moles) of epichlorohydrin. The reaction mixture was stirred and refluxed for 18 hrs. After cooling to room temperature, 37.3 g (0.27 moles) of $K_2CO_3$ was added to the reaction mixture which was then stirred for 2 hrs. The filtrate was distilled at atmospheric pressure to remove methanol, then at reduced pressure (50°–55° C.) to obtain 286 g (36% yield) of product.

The NMR spectrum of the product included the expected absence of epoxide resonances and the addition of a methoxy resonance. The remaining two methylene, methine, and alcohol resonances were as expected for 1-methoxy-2-hydroxy-3-chloropropane.

STEP 2

1,2-epoxy-3-methoxypropane

Into a 2-l., three-necked, round bottom flask, fitted with a condenser, and mechanical stirrer were placed 200.2 g (1.6 moles) of the 1-methoxy-2-hydroxy-3-chloropropane from Step 1 and 1.6 l. of diethyl ether. The flask was immersed in an ice-water bath, and 96.0 g (2.4 moles) of NaOH was then added in small portions over a 2.5 hr. period to the vigorously stirred reaction mixture. The reaction mixture was allowed to warm to room temperature and was stirred overnight. The ether phase was then washed with $H_2O$ (2×100 ml). The combined aqueous extracts were washed once with 200 ml of diethyl ether. The combined diethyl ether extracts were dried with $Na_2SO_4$. The dried extracts were distilled at atmospheric pressure to remove diethyl ether, then under reduced pressure (35° C.) to obtain 93.5 g (67%) yield of product.

The NMR spectrum of the product included the expected epoxide, methoxy and methylene resonances for 1,2-epoxy-3-methoxy-propane.

STEP 3

Reaction of 1,2-epoxy-3-methoxypropane and poly(ethylene glycol)methyl ether

Into a 250 ml, three-necked, round bottom flask, fitted with a condenser, addition funnel, and magnetic stirrer were placed 175.0 g (0.5 moles) of poly(ethylene glycol)methyl ether (M.W. 350), and 1.1 g (0.05 moles) of NaH. The mixture was stirred vigorously and heated to 80° C. under an argon atmosphere for 15 minutes. Then 88.4 g of the 1,2-epoxy-3-methoxypropane from Step 2 was added dropwise over a 6 hr. period. This reaction mixture was heated at 90° C. for 30 hrs. During this time, an additional 4.0 g (0.2 moles) of NaH was added periodically in small portions to maintain a pH of 10-11. (It is believed that some of the alkoxide generated by the NaH was consumed by a small amount of residual chlorosubstituted materials in the 1,2-epoxy-3-methoxypropane).

The reaction mixture was monitored by H-NMR and was considered complete following the absence of epoxide resonances. After 30 hours, the reaction mixture was allowed to cool to room temperature and 10.2 g (0.2 moles) of acetic acid was then added to neutralize the mixture. The reaction mixture was stirred for 15 min., then excess acetic acid was removed on a Kugelrohr reciprocating evaporator at 100° C. for 5.5 hrs. This resulted in 255.1 g. (97% yield) of product.

The NMR spectrum of the product included the expected resonances for the methoxy and ethoxylate groups, and the absence of epoxide resonances.

The preferred method for preparing polyesters of the present invention comprises reacting the desired mixture of lower dialkyl esters (methyl, ethyl, propyl or butyl) of the dicarboxylic acid with a mixture of the 1,2-propylene glycol, the PEG and the capped PEG. The glycol esters and oligomers produced in this ester interchange reaction are then polymerized to the desired degree. The ester interchange reaction can be conducted in accordance with reaction conditions generally used for ester interchange reactions. This ester interchange reaction is usually conducted at temperatures of from 120° to 220° C. in the presence of an esterification catalyst. Alcohol is formed and constantly removed thus forcing the reaction to completion. The temperature and pressure of the reaction are desirably controlled so that glycol does not distill from the reaction mixture. Higher temperatures can be used if the reaction is conducted under pressure.

The catalysts used for the ester interchange reaction are those well known to the art. These catalysts include alkyl and alkaline earth metals, for example lithium, sodium, calcium, and magnesium, as well as transition and Group II B metals, for example antimony, maganese, cobalt, and zinc, usually as the respective oxides, carbonates, or acetates. Typically, antimony trioxide and calcium acetate are used.

The extent of the ester interchange reaction can be monitored by the amount of alcohol liberated or the disappearance of the dialkyl esters of the dibasic acids in the reaction mixture as determined by high performance liquid chromatography (HPLC) or any other suitable method. The ester interchange reaction is desirably taken to more than 90% completion. Greater than 95% completion is preferred in order to decrease the amount of sublimates obtained in the polymerization step.

If desired, stabilizers such as phosphorus and phosphoric acid and esters thereof can be added at the end of the ester interchange step. The purpose of the stabilizer is to inhibit degradation, oxidation, and other side reactions; to destroy the catalytic activity of the ester interchange catalyst; and to prevent precipitation of insoluble metal carboxylates. Typically, stabilizers are not used to make the polyesters of the present invention.

When the ester interchange reaction is complete, the glycol ester products are then polymerized to produce polyesters. The desired degree of polymerization can be determined by HPLC and $^{13}C$-NMR analysis. For commercial processes, the polymerization reaction is usually conducted at temperatures of from about 200° to about 250° C. in the presence of a catalyst. Higher temperatures can be used but tend to produce darker colored products. Illustrative examples of catalysts useful for the polymerization step include antimony trioxide, germanium dioxide, titanium alkoxide, hydrated antimony pentoxide, and ester interchange catalysts such the as salts of zinc, cobalt, and maganese.

Excess glycol and other volatiles liberated during the reaction are removed under vacuum. The reaction is continued until polymerization is nearly complete based on analysis by $^{13}C$-NMR and/or reverse phase HPLC and/or gel phase permeation. In addition to the desired polyesters, the crude composition obtained after synthesis contains starting reactants, as well as intermediate products.

Representative examples of specific polyesters formed according to the present invention are as follows:

EXAMPLE 1

Into a 1000 ml, three-necked, round bottom flask, fitted with a magnetic stirrer, and a modified claisen head (to support a condenser and receiver flask) were placed 66.5 g. (0.877 moles) of 1,2-propylene glycol and 2.5 g (0.5% w/w) of $Sb_2O_3$ catalyst. This mixture was heated to 150° C. for 1 hr. to predissolve the catalyst and then cooled to room temperature. Then 125.7 g (0.162 moles) of poly(ethylene glycol) methyl ether (M.W. 750), 133.7 g. (0.689 moles) of dimethyl terephthalate, 166.5 g. of PEG (M.W. 1000), and 0.5 g (0.1% w/w) of butylated hydroxytoluene were added. Under argon, the reaction mixture was heated to 175° C. for 22 hrs. The temperature was then raised to 200° C. for an additional 10.5 hr. period. During this time, 41.3 g. (94% of theoretical value) of methanol was distilled from the reaction mixture. The reaction mixture was then cooled for 0.5 hrs. The reaction mixture was placed on a Kugelrohr reciprocating evaporator, raised to a temperature of 200° C. over a 1 hr. period and then held at 200° C. for 4 hrs. The reaction was determined to be complete by H-NMR.

EXAMPLE 2

Under reaction conditions similar to Example 1, a polyester is prepared from 30.0 g. (0.016 moles) of a poly(ethylene glycol)methyl ether of M.W. 1900, 23.3 g. (0.12 moles) of dimethyl terephthalate, 64.0 g. (0.016 moles) of a PEG of M.W. 4000, and 14.6 g. (0.192 moles) of 1,2-propylene glycol.

EXAMPLE 3

Under reaction conditions similar to Example 1, a polyester is prepared from 30.0 g. (0.016 moles) of a poly(ethylene glycol)methyl ether of M.W. 1900, 25.6 g. (0.132 moles) of dimethyl terephthalate, 60.0 g. (0.04 moles) of a PEG of M.W. 1500, and 12.8 g. (0.168 moles) of 1,2-propylene glycol.

EXAMPLE 4

Under reaction conditions similar to Example 1, a polyester is prepared from 30.0 g. (0.086 moles) of a poly(ethylene glycol)methyl ether of M.W. 350, 68.9 g. (0.355 moles) of dimethyl terephthalate, 51.6 g. (0.086 moles) of a PEG of M.W. 600, and 34.4 g. (0.452 moles) of 1,2-propylene glycol.

LAUNDRY DETERGENT COMPOSITIONS

A. Soil Release Component

The compounds of the present invention are particularly useful in certain laundry detergent compositions to provide soil release properties. These compositions can be used as laundry detergents, laundry additives, and laundry pre-treatments.

The laundry detergent compositions of the present invention comprise a soil release component which contains an effective amount of the soil release compounds previously defined. What is an "effective amount" will depend upon the particular soil release compounds used, the particular type of detergent formulation (liquid, granular, etc.) and the benefits desired. Usually, the soil release compounds are effective when included in an amount from about 0.01 to about 10% by weight of the composition. In terms of soil release benefits, preferred laundry detergent compositions can comprise from about 0.1 to about 5% by weight of the soil release compounds, but typically comprise from about 0.3 to about 3% by weight of these compounds.

For granular detergent formulations, the soil release component typically comprises the soil release compounds, plus any protective enrobing material. In making granular detergent formulations, the soil release compounds could be exposed to highly alkaline materials such as NaOH and KOH. The soil release compounds, in particular those having shorter backbones, can be degraded by alkaline environments, especially those above a pH of about 8.5. Accordingly, the soil release compounds are preferably enrobed in a material which protects them from the alkaline environment of a granular detergent formulation yet permits the soil release compounds to be dispersed in the laundering operation.

Suitable enrobing materials include the nonionic surfactants, polyethylene glycols (PEG), fatty acids, fatty acid esters of alcohols, diols and polyols, anionic surfactants, film forming polymers and mixtures of these materials. Examples of suitable nonionic surfactant enrobing materials are described in the Detergent Surfactant section of this application. Examples of suitable PEG enrobing materials are those having an average M.W. of from about 2,000 to 15,000, preferably from about 3,000 to about 10,000 and most preferably from about 4,000 to about 8,000. Examples of suitable fatty acid enrobing materials are the higher fatty acids having from 12 to 18 carbon atoms. Examples of suitable fatty acid ester enrobing materials include the sorbitan fatty acid esters (e.g. sorbitan monolaurate). Other examples of suitable enrobing materials, including anionic surfactants and film forming polymers, are disclosed in U.S. Pat. No. 4,486,327 to Murphy et al., issued Dec. 4, 1984, which is incorporated by reference. The soil release compounds can be enrobed according to the methods disclosed in this Murphy et al. patent.

For liquid detergent formulations, the soil release component can be comprised entirely of soil release compounds or can further include a water-soluble organic solvent or an hydrotrope to aid in dissolving the soil release compounds. Suitable organic solvents are usually aromatic and can include ethyl benzoate, phenoxyethanol, methyl-o-toluate, 2-methoxybenzyl alcohol and pyrrolidone. Suitable hydrotropes include the methyl capped PEGs and shorter backbone polyesters. These short backbone polyesters are more water-soluble, and, accordingly, can function as hydrotropes for the longer backbone, less water-insoluble polyesters.

The amount, or even need for, organic solvents or hydrotropes to prepare liquid detergent formulations containing the soil release compounds of the present invention will depend upon the compounds used, especially what fraction thereof is water-soluble, the ingredients present in the laundry detergent system, and whether an isotropic, homogeneous liquid is desired. For isotropic liquid detergent formulations, the soil release compounds need to be dissolved as much as possible which sometimes requires the use of organic solvents or hydrotropes. Also, it is believed that dissolving the compounds in liquid detergent formulations makes them more effective as soil release agents.

B. Laundry Detergent Surfactant System

Laundry compositions of the present invention comprise from about 5 to about 75% by weight nonionic detergent surfactant. Preferably, the nonionic detergent surfactant comprises from about 10 to about 40% by weight of the composition, and most preferably from about 15 to about 30% by weight.

Suitable nonionic surfactants for use in laundry compositions of the present invention are generally disclosed in U.S. Pat. No. 3,929,678 to Laughlin et al., issued Dec. 30, 1975 at column 13, line 14 through column 16, line 6 (herein incorporated by reference). Classes of nonionic surfactants included are:

1. The polyethylene oxide condensates of alkyl phenols. These compounds include the condensation products of alkyl phenols having an alkyl group containing from about 6 to 12 carbon atoms in either a straight chain or branched chain configuration with ethylene oxide, the ethylene oxide being present in an amount equal to 5 to 25 moles of ethylene oxide per mole of alkyl phenol. The alkyl substituent in such compounds can be derived, for example, from polymerized propylene, diisobutylene, and the like. Examples of compounds of this type include nonyl phenol condensed with about 9.5 moles of ethylene oxide per mole of nonyl phenol; dodecylphenol condensed with about 12 moles of ethylene oxide per mole of phenol; dinonyl phenol condensed with about 15 moles of ethylene oxide per mole of phenol; and diisooctyl phenol condensed with about 15 moles of ethylene oxide per mole of phenol. Commercially available nonionic surfactants of this type include Igepal CO-630, marketed by the GAF Corporation, and Triton X-45, X-114, X-100, and X-102, all marketed by the Rohm & Haas Company.

2. The condensation products of aliphatic alcohols with from about 1 to about 25 moles of ethylene oxide. The alkyl chain of the aliphatic alcohol can either be straight or branched, primary or secondary, and generally contains from about 8 to about 22 carbon atoms. Examples of such ethoxylated alcohols include the condensation product of myristyl alcohol condensed with about 10 moles of ethylene oxide per mole of alcohol; and the condensation product of about 9 moles of ethylene oxide with coconut alcohol (a mixture of fatty alcohols with alkyl chains varying in length from 10 to 14 carbon atoms). Examples of commercially available nonionic surfactants of this type include Tergitol 15-S-9, marketed by Union Carbide Corporation, Neodol 45-9, Neodol 23-6.5, Neodol 45-7, and Neodol 45-4, marketed by Shell Chemical Company, and Kyro EOB, marketed by The Procter & Gamble Company.

3. The condensation products of ethylene oxide with a hydrophobic base formed by the condensation of propylene oxide with propylene glycol. The hydrophobic portion of these compounds has a molecular weight of from about 1500 to 1800 and exhibits water insolubility. The addition of polyoxyethylene moieties to this hydrophobic portion tends to increase the water solubility of the molecule as a whole, and the liquid character of the product is retained up to the point where the polyoxyethylene content is about 50% of the total weight of the condensation product, which corresponds to condensation with up to about 40 moles of ethylene oxide. Examples of compounds of this type include certain of the commercially available Pluronic surfactants, marketed by Wyandotte Chemical Corporation.

4. The condensation products of ethylene oxide with the product resulting from the reaction of propylene oxide and ethylenediamine. The hydrophobic moiety of these products consists of the reaction product of ethylenediamine and excess propylene oxide, the moiety having a molecular weight of from about 2500 to about 3000. This hydrophobic moiety is condensed with ethylene oxide to the extent that the condensation product contains from about 40% to about 80% by weight of polyoxyethylene and has a molecular weight of from about 5,000 to about 11,000. Examples of this type of nonionic surfactant include certain of the commercially available Tetronic compounds, marketed by Wyandotte Chemical Corporation.

5. Semi-polar nonionic detergent surfactants which include water-soluble amine oxides containing one alkyl moiety of from about 10 to 18 carbon atoms and 2 moieties selected from the group consisting of alkyl groups and hydroxyalkyl groups containing from 1 to about 3 carbon atoms; water-soluble phosphine oxides containing one alkyl moiety of from about 10 to 18 carbon atoms and 2 moieties selected from the group consisting of alkyl groups and hydroxyalkyl groups containing from about 1 to 3 carbon atoms; and water-soluble sulfoxides containing one alkyl moiety of from about 10 to 18 carbon atoms and a moiety selected from the group consisting of alkyl and hydroxyalkyl moieties of from about 1 to 3 carbon atoms.

Preferred semi-polar nonionic detergent surfactants are the amine oxide detergent surfactants having the formula

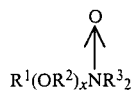

wherein $R^1$ is an alkyl, hydroxyalkyl, or alkyl phenyl group or mixtures thereof containing from about 8 to about 22 carbon atoms; $R^2$ is an alkylene or hydroxyalkylene group containing from 2 to 3 carbon atoms or mixtures thereof; x is from 0 to about 3; and each $R^3$ is an alkyl or hydroxyalkyl group containing from 1 to about 3 carbon atoms or a polyethylene oxide group containing from one to about 3 ethylene oxide groups. The $R^3$ groups can be attached to each other, e.g., through an oxygen or nitrogen atom to form a ring structure.

Preferred amine oxide detergent surfactants are $C_{10}$–$C_{18}$ alkyl dimethyl amine oxide and $C_8$–$C_{12}$ alkoxy ethyl dihydroxy ethyl amine oxide.

6. Alkylpolysaccharides disclosed in European Patent Application 70,074 to Ramon A. Llenado, published Jan. 19, 1983, having a hydrophobic group containing from about 6 to about 30 carbon atoms, preferably from about 10 to about 16 carbon atoms and a polysaccharide, e.g., a polyglycoside, hydrophilic group containing from about 1½ to about 10, preferably from about 1½ to about 3, most preferably from about 1.6 to about 2.6 saccharide units. Any reducing saccharide containing 5 or 6 carbon atoms can be used. e.g. glucose, galactose and galactosyl moieties can be substituted for the glucosyl moieties. (Optionally the hydrophobic group is attached at the 2, 3, 4, etc. positions thus giving a glucose or galactose as opposed to a glucoside or galactoside). The intersaccharide bonds can be, e.g., between the one position of the additional saccharide units and the 2-, 3-, 4-, and/or 6 positions of the preceding saccharide units.

Optionally, and less desirably, there can be a polyalkylene-oxide chain joining the hydrophobic moiety and the polysaccharide moiety. The preferred alkyleneoxide is ethylene oxide. Typical hydrophobic groups include alkyl groups, either saturated or unsaturated, branched or unbranched containing from about 8 to about 18, preferably from about 10 to about 16, carbon atoms. Preferably, the alkyl group is a straight chain saturated alkyl group. The alkyl group can contain up to 3 hydroxy groups and/or the polyalkyleneoxide chain can contain up to about 10, preferably less than 5, most preferably 0, alkyleneoxide moieties. Suitable alkyl polysaccharides are octyl, nonyldecyl, undecyldodecyl, tridecyl, tetradecyl, pentadecyl, hexadecyl, heptadecyl, and octadecyl, di-, tri-, tetra-, penta-, and hexaglucosides, galactosides, lactosides, glucoses, fructosides, fructoses, and/or galactoses. Suitable mixtures include coconut alkyl, di-, tri-, tetra-, and pentaglucosides and tallow alkyl tetra-, penta-, and hexaglucosides.

The preferred alkylpolyglycosides have the formula

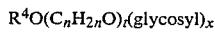

$R^4O(C_nH_{2n}O)_t(glycosyl)_x$ wherein $R^4$ is selected from the group consisting of alkyl, alkylphenyl, hydroxyalkyl, hydroxyalkylphenyl, and mixtures thereof in which the alkyl groups contain from about 10 to about 18, preferably from about 12 to about 14, carbon atoms; n is 2 or 3, preferably 2; t is from 0 to about 10, preferably 0; and x is from 1½ to about 10, preferably from about 1½ to about 3, most preferably from about 1.6 to about 2.7. The glycosyl is preferably derived from glucose. To prepare these compounds, the alcohol or alkylpolyethoxy alcohol is formed first and then reacted with glucose, or a source of glucose, to form the glucoside (attachment at the 1-position). The additional glycosyl units can then be attached between their 1-position and the preceding glycosyl units 2-, 3-, 4- and/or 6-position, preferably predominately the 2-position.

7. Fatty acid amide detergent surfactants having the formula:

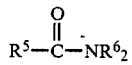

$$R^5-\overset{O}{\underset{\|}{C}}-NR^6_2$$

wherein $R^5$ is an alkyl group containing from about 7 to about 21 (preferably from about 9 to about 17) carbon atoms and each $R^6$ is selected from the group consisting of hydrogen, $C_1$-$C_4$ alkyl, $C_1$-$C_4$ hydroxyalkyl, and $-(C_2H_4O)_xH$ where x varies from about 1 to about 3.

Preferred amides are $C_8$-$C_{20}$ ammonia amides, monoethanolamides, diethanolamides, and isopropanol amides.

Preferred nonionic detergent surfactants for use in laundry compositions of the present invention are the ethoxylated alcohols and alkylphenols of formula:

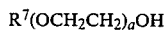

$R^7(OCH_2CH_2)_aOH$ wherein $R^7$ is a $C_{10}$-$C_{16}$ alkyl or a $C_8$-$C_{12}$ alkyl phenol group; a is from about 3 to about 9; and the hydrophile-lipophile balance (HLB) is from about 10 to about 13. Particularly preferred are condensation products of $C_{12}$-$C_{14}$ alcohols with from about 3 to about 7 moles of ethylene oxide per mole of alcohol, e.g., $C_{12}$-$C_{13}$ alcohol condensed with about 6.5 moles of ethylene oxide per mole of alcohol.

Laundry compositions of the present invention also comprise from 0 to about 15% by weight (preferably from 0 to about 10% by weight) synthetic anionic detergent surfactants. These synthetic anionic detergent surfactants include the water-soluble salts, typically the alkali metal, ammonium and alkylolammonium salts, of organic sulfuric reaction products having in their molecular structure an alkyl group containing from about 10 to about 20 carbon atoms and a sulfonic acid or sulfuric acid ester group. (Included in the term "alkyl" is the alkyl portion of acyl groups.)

Examples of this group of synthetic anionic surfactants are the sodium and potassium alkyl sulfates, especially those obtained by sulfating the higher alcohols ($C_8$-$C_{18}$ carbon atoms) such as those produced by reducing the glycerides of tallow or coconut oil; and the sodium and potassium alkylbenzene sulfonates in which the alkyl group contains from about 9 to about 15 carbon atoms, in straight chain or branched chain configuration, e.g., those of the type described in U.S. Pat. Nos. 2,220,099 and 2,477,383. Especially valuable are linear straight chain alkylbenzene sulfonates in which the average number of carbon atoms in the alkyl group is from about 11 to 13, abbreviated as $C_{11}$-$C_{13}$LAS.

Synthetic anionic surfactants of this type also include the alkyl polyethoxylate sulfates, particularly those in which the alkyl group contains from about 10 to about 22, preferably from about 12 to about 18 carbon atoms, and wherein the polyethoxylate chain contains from about 1 to about 15 ethoxylate moieties preferably from about 1 to about 3 ethoxylate moieties.

Other synthetic anionic surfactants of this type include sodium alkyl glyceryl ether sulfonates, especially those ethers of higher alcohols derived from tallow and coconut oil; sodium coconut oil fatty acid monoglyceride sulfonates and sulfates; sodium or potassium salts of alkyl phenol ethylene oxide ether sulfates containing from about 1 to about 10 units of ethylene oxide per molecule and wherein the alkyl groups contain from about 8 to about 12 carbon atoms; and sodium or potassium salts of alkyl ethylene oxide ether sulfates containing about 1 to about 10 units of ethylene oxide per molecule and wherein the alkyl group contains from about 10 to about 20 carbon atoms.

Other synthetic anionic surfactants also included are water-soluble salts of esters of alpha-sulfonated fatty acids containing from about 6 to 20 carbon atoms in the fatty acid group and from about 1 to 10 carbon atoms in the ester group; water-soluble salts of 2-acyloxy-alkane-1-sulfonic acids containing from about 2 to 9 carbon atoms in the acyl group and from about 9 to about 23 carbon atoms in the alkane moiety; alkyl ether sulfates containing from about 10 to 20 carbon atoms in the alkyl group and from about 1 to 30 moles of ethylene oxide; water-soluble salts of olefin sulfonates containing from about 12 to 24 carbon atoms; and beta-alkyloxy alkane sulfonates containing from about 1 to 3 carbon atoms in the alkyl group and from about 8 to 20 carbon atoms in the alkane moiety.

The laundry compositions of the present invention can also include ampholytic, zwitterionic and cationic detergent surfactants, as well as alkali metal soaps.

Ampholytic surfactants can be broadly described as aliphatic derivatives of secondary or tertiary amines, or aliphatic derivatives of heterocyclic secondary and tertiary amines in which the aliphatic radical can be straight chain or branched and wherein one of the aliphatic substituents contains from about 8 to 18 carbon atoms and at least one contains an anionic water-solubilizing group, e.g. carboxy, sulfonate, sulfate. See U.S. Pat. No. 3,929,678 to Laughlin et al., issued Dec. 30, 1975 at column 19, lines 18-35 (herein incorporated by reference) for examples of ampholytic surfactants.

Zwitterionic surfactants can be broadly described as derivatives of secondary and tertiary amines, derivatives of heterocyclic secondary and tertiary amines, or derivatives of quaternary ammonium, quaternary phosphonium or tertiary sulfonium compounds. See U.S. Pat. No. 3,929,678 to Laughlin et al., issued Dec. 30, 1975 at column 19, line 38 through column 22, line 48 (herein incorporated by reference) for examples of zwitterionic surfactants.

Suitable cationic surfactants include the quaternary ammonium surfactants having the formula:

$$[R^1(OR^2)_y][R^3(OR^2)_y]_2R^4N^+X^-$$

wherein $R^1$ is an alkyl or alkyl benzyl group having from about 8 to about 18 carbon atoms in the alkyl chain; each $R^2$ is selected from the group consisting of $-CH_2CH_2-$, $-CH_2CH(CH_3)-$, $-CH_2CH(CH_2OH)-$, $-CH_2CH_2CH_2-$, and mixtures thereof; each $R^3$ is selected from the group consisting of $C_1-C_4$ alkyl, $C_1-C_4$ hydroxyalkyl, benzyl, ring structures formed by joining the two $R^3$ groups, $-CH_2CHOH-CHOHCOR^5CHOHCH_2OH$ wherein $R^5$ is any hexose or hexose polymer having a molecular weight less than about 1000, and hydrogen when y is not 0; $R^4$ is the same as $R^3$ or is an alkyl chain wherein the total number of carbon atoms of $R^1$ plus $R^4$ is not more than about 18; each y is from 0 to about 10 and the sum of the y values is from 0 to about 15; and X is any compatible anion.

Preferred of the above are the alkyl quaternary ammonium surfactants, especially the mono-long chain alkyl surfactants described in the above formula when $R^4$ is selected from the same groups as $R^3$. The most preferred quaternary ammonium surfactants are the chloride, bromide and methylsulfate $C_8-C_{16}$ alkyl trimethylammonium salts, $C_8-C_{16}$ alkyl di(hydroxyethyl)methylammonium salts, the $C_8-C_{16}$ alkyl hydroxyethyldimethylammonium salts, and $C_8-C_{16}$ alkyloxypropyl trimethylammonium salts. Of the above, decyl trimethylammonium methylsulfate, lauryl trimethylammonium chloride, myristyl trimethylammonium bromide and coconut trimethylammonium chloride and methylsulfate are particularly preferred.

Other useful cationic surfactants are disclosed in U.S. Pat. No. 4,259,217 to Murphy, issued Mar. 31, 1981, herein incorporated by reference.

The alkali metal soaps which are useful include the sodium, potassium, ammonium and alkylolammonium salts of higher fatty acids containing from about 8 to about 24 carbon atoms, preferably from about 10 to about 20 carbon atoms.

C. Detergent Builders

Laundry detergent compositions of the present invention can optionally comprise inorganic or organic detergent builders to assist in mineral hardness control. When included, these builders typically comprise up to about 60% by weight of the composition. Built liquid formulations preferably comprise from about 1 to about 25% by weight detergent builder, most preferably from about 3 to about 20% by weight, while built granular formulations preferably comprise from about 5 to about 50% by weight detergent builder, most preferably from about 10 to about 30% by weight.

Suitable detergent builders include crystalline aluminosilicate ion exchange materials having the formula:

$$Na_z[(AlO_2)_z \cdot (SiO_2)_y] \cdot xH_2O$$

wherein z and y are at least about 6, the mole ratio of z to y is from about 1.0 to about 0.5; and x is from about 10 to about 264. Amorphous hydrated aluminosilicate materials useful herein have the empirical formula $$M_z(zAlO_2 \cdot ySiO_2)$$

wherein M is sodium, potassium, ammonium or substituted ammonium, z is from about 0.5 to about 2; and y is 1; this material having a magnesium ion exchange capacity of at least about 50 milligram equivalents of $CaCO_3$ hardness per gram of anhydrous aluminosilicate.

The aluminosilicate ion exchange builder materials are in hydrated form and contain from about 10% to about 28% of water by weight if crystalline, and potentially even higher amounts of water if amorphous. Highly preferred crystalline aluminosilicate ion exchange materials contain from about 18% to about 22% water in their crystal matrix. The preferred crystalline aluminosilicate ion exchange materials are further characterized by a particle size diameter of from about 0.1 micron to about 10 microns. Amorphous materials are often smaller, e.g., down to less than about 0.01 micron. More preferred ion exchange materials have a particle size diameter of from about 0.2 micron to about 4 microns. The term "particle size diameter" represents the average particle size diameter of a given ion exchange material as determined by conventional analytical techniques such as, for example, microscopic determination utilizing a scanning electron microscope. The crystalline aluminosilicate ion exchange materials are usually further characterized by their calcium ion exchange capacity, which is at least about 200 mg. equivalent of $CaCO_3$ water hardness/g. of aluminosilicate, calculated on an anhydrous basis, and which generally is in the range of from about 300 mg. eq./g. to about 352 mg. eq./g. The aluminosilicate ion exchange materials are still further characterized by their calcium ion exchange rate which is at least about 2 grains $Ca^{++}$/gallon/minute/gram/gallon of aluminosilicate (anhydrous basis), and generally lies within the range of from about 2 grains/gallon/minute/gram/gallon to about 6 grains/gallon/minute/gram/gallon, based on calcium ion hardness. Optimum aluminosilicates for builder purposes exhibit a calcium ion exchange rate of at least about 4 grains/gallon/minute/gram/gallon.

The amorphous aluminosilicate ion exchange materials usually have a $Mg^{++}$ exchange capacity of at least about 50 mg. eq. $CaCO_3$/g. (12 mg. $Mg^{++}$/g.) and a $Mg^{++}$ exchange rate of at least about 1 grain/gallon/minute/gram/gallon. Amorphous materials do not exhibit an observable diffraction pattern when examined by Cu radiation (1.54 Angstrom Units).

Useful aluminosilicate ion exchange materials are commercially available. These aluminosilicates can be crystalline or amorphous in structure and can be naturally-occurring aluminosilicates or synthetically derived. A method for producing aluminosilicate ion exchange materials is disclosed in U.S. Pat. No. 3,985,669 to Krummel, et al., issued Oct. 12, 1976 (herein incorporated by reference). Preferred synthetic crystalline aluminosilicate ion exchange materials useful herein are available under the designations Zeolite A, Zeolite P (B), and Zeolite X. In an especially preferred embodiment, the crystalline aluminosilicate ion exchange material has the formula $Na_{12}[(AlO_2)_{12}(SiO_2)_{12}] \cdot xH_2O$ wherein x is from about 20 to about 30, especially about 27.

Other examples of detergency builders include the various water-soluble, alkali metal, ammonium or substituted ammonium phosphates, polyphosphates, phosphonates, polyphosphonates, carbonates, silicates, borates, polyhydroxysulfonates, polyacetates, carboxylates, and polycarboxylates. Preferred are the alkali metal, especially sodium, salts of the above.

Specific examples of inorganic phosphate builders are sodium and potassium tripolyphosphate, pyrophosphate, polymeric metaphosphate having a degree of polymerization of from about 6 to 21, and orthophosphate. Examples of polyphosphonate builders are the sodium and potassium salts of ethylene-1,1-diphosphonic acid, the sodium and potassium salts of ethane 1-hydroxy-1,1-diphosphonic acid and the sodium and potassium salts of ethane, 1,1,2-triphosphonic acid. Other phosphorus builder compounds are disclosed in U.S. Pat. Nos. 3,159,581; 3,213,030; 3,422,021; 3,422,137; 3,400,176 and 3,400,148 (all herein incorporated by reference).

Examples of nonphosphorus, inorganic builders are sodium and potassium carbonate, bicarbonate, sesquicarbonate, tetraborate decahydrate, and silicate having a mole ratio of $SiO_2$ to alkali metal oxide of from about 0.5 to about 4.0, preferably from about 1.0 to about 2.4.

Useful water-soluble, nonphosphorus organic builders include the various alkali metal, ammonium and substituted ammonium polyacetates, carboxylates, polycarboxylates and polyhydroxysulfonates. Examples of polyacetate and polycarboxylate builders are the sodium, potassium, lithium, ammonium and substituted ammonium salts of ethylenediamine tetraacetic acid, nitrilotriacetic acid, oxydisuccinic acid, mellitic acid, benzene polycarboxylic acids, citric acid, and 2-hydroxyethyl ethylenediamine triacetic acid.

Highly preferred polycarboxylate builders are disclosed in U.S. Pat. No. 3,308,067 to Diehl, issued Mar. 7, 1967 (herein incorporated by reference). Such materials include the water-soluble salts of homo- and copolymers of aliphatic carboxylic acids such as maleic acid, itaconic acid, mesaconic acid, fumaric acid, aconitic acid, citraconic acid and methylenemalonic acid.

Other builders include the carboxylated carbohydrates disclosed in U.S. Pat. No. 3,723,322 to Diehl issued Mar. 28, 1973 (herein incorporated by reference).

Other useful builders are sodium and potassium carboxymethyloxymalonate, carboxymethyloxysuccinate, cis-cyclohexanehexacarboxylate, cis-cyclopentanetetracarboxylate phloroglucinol trisulfonate, water-soluble polyacrylates (having molecular weights of from about 2,000 to about 200,000 for example), and the co-polymers of maleic anhydride with vinyl methyl ether or ethylene.

Other suitable polycarboxylates are the polyacetal carboxylates disclosed in U.S. Pat. No. 4,144,226, to Crutchfield et al., issued Mar. 13, 1979, and U.S. Pat. No. 4,246,495, to Crutchfield et al., issued Mar. 27, 1979 (both herein incorporated by reference). These polyacetal carboxylates can be prepared by bringing together under polymerization conditions an ester of glyoxylic acid and a polymerization initiator. The resulting polyacetal carboxylate ester is then attached to chemically stable end groups to stabilize the polyacetal carboxylate against rapid depolymerization in alkaline solution, converted to the corresponding salt, and added to a surfactant.

D. Clay Soil Removal/Anti-Redeposition Agents

Laundry detergent compositions of the present invention desirably include a clay soil removal and/or anti-redeposition agent. These clay soil removal/anti-redeposition agents are usually included at from about 0.1 to about 10% by weight of the composition. In terms of the benefits achieved, preferred laundry compositions can comprise from about 0.5 to about 5% by weight of these agents. Typically, these preferred compositions comprise from about 1 to about 3% by weight of these agents.

One group of preferred clay soil removal/anti-redeposition agents are the ethoxylated amines disclosed in European patent application 112,593 to James M. Vander Meer, published July 4, 1984, herein incorporated by reference. These ethoxylated amines are selected from the group consisting of:

(1) ethoxylated monoamines having the formula:

$$(X-L-)-N-(R^2)_2$$

(2) ethoxylated diamines having the formula:

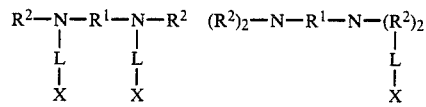

or $$(X-L-)_2-N-R^1-N-(R^2)_2$$

(3) ethoxylated polyamines having the formula:

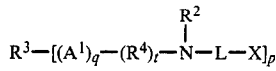

(4) ethoxylated amine polymers having the general formula:

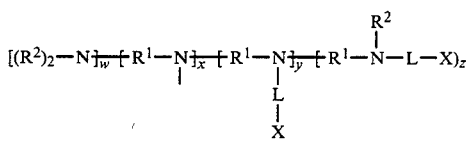

and (5) mixtures thereof; wherein $A^1$ is

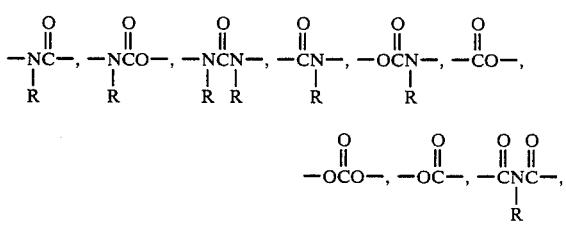

or $-O-$; R is H or $C_1-C_4$ alkyl or hydroxyalkyl; $R^1$ is $C_2-C_{12}$ alkylene, hydroxyalkylene, alkenylene, arylene or alkarylene, or a $C_2-C_3$ oxyalkylene moiety having from 2 to about 20 oxyalkylene units provided that no O—N bonds are formed; each $R^2$ is $C_1-C_4$ alkyl or hydroxyalkyl, the moiety —L—X, or two R² together form the moiety —(CH₂)ᵣ—A²—(CH₂)ₛ—, wherein A² is —O— or —CH₂—, r is 1 or 2, s is 1 or 2, and r+s is 3 or 4; X is a nonionic group, an anionic group or mixture thereof; R³ is a substituted C₃-C₁₂ alkyl, hydroxyalkyl, alkenyl, aryl, or alkaryl group having p substitution sites; R⁴ is C₁-C₁₂ alkylene, hydroxyalkylene, alkenylene, arylene or alkarylene, or a C₂-C₃ oxyalkylene moiety having from 2 to about 20 oxyalkylene units provided that no O—O or O—N bonds are formed; L is a hydrophilic chain which contains the polyoxyalkylene moiety $-\!\!\left[(R^5O)_m(CH_2CH_2O)_n\right]\!\!-$, wherein R⁵ is C₃-C₄ alkylene or hydroxyalkylene and m and n are numbers such that the moiety —(CH₂CH₂O)— comprises at least about 50% by weight of said polyoxyalkylene moiety; for said monoamines, m is from 0 to about 4, and n is at least about 12; for said diamines, m is from 0 to about 3, and n is at least about 6 when R¹ is C₂-C₃ alkylene, hydroxyalkylene, or alkenylene, and at least about 3 when R¹ is other than C₂-C₃ alkylene, hydroxyalkylene or alkenylene; for said polyamines and amine polymers, m is from 0 to about 10 and n is at least about 3; p is from 3 to 8; q is 1 or 0; t is 1 or 0, provided that t is 1 when q is 1; w is 1 or 0; x+y+z is at least 2; and y+z is at least 2.

Another group of preferred clay soil removal/anti-redeposition agents are the cationic compounds disclosed in European patent application 111,965 to Young S. Oh and Eugene P. Gosselink, published June 27, 1984, herein incorporated by reference. These cationic compounds are selected from the group consisting of:

(1) ethoxylated cationic monoamines having the formula:

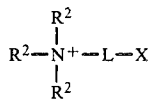

(2) ethoxylated cationic diamines having the formula:

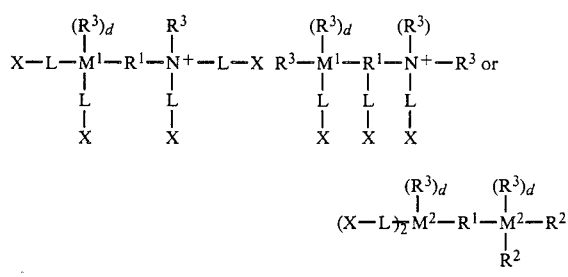

wherein M¹ is an N⁺ or N group; each M² is an N⁺ or N group, and at least one M² is an N⁺ group;

(3) ethoxylated cationic polyamines having the formula:

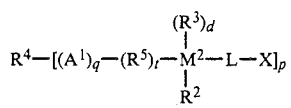

(4) ethoxylated cationic polymers which comprise a polymer backbone, at least 2M groups and at least one L—X group, wherein M is a cationic group attached to or integral with the backbone and contains an N⁺ positively charged center; and L connects groups M and X or connects group X to the polymer backbone; and (5) mixtures thereof; wherein A¹ is

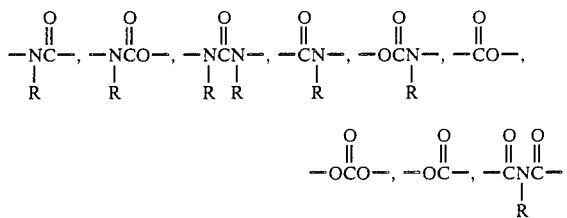

or —O—, R is H or C₁-C₄ alkyl or hydroxyalkyl, R¹ is C₂-C₁₂ alkylene, hydroxyalkylene, alkenylene, arylene or alkarylene, or a C₂-C₃ oxyalkylene moiety having from 2 to about 20 oxyalkylene units provided that no O—N bonds are formed; each R² is C₁-C₄ alkyl or hydroxyalkyl, the moiety —L—X or two R² together form the moiety —(CH₂)ᵣ—A²—(CH₂)ₛ—, wherein A² is —O— or —CH₂—, r is 1 or 2, s is 1 or 2 and r+s is 3 or 4; each R³ is C₁-C₈ alkyl or hydroxyalkyl, benzyl, the moiety —L—X, or two R³ or one R² and one R³ together form the moiety —(CH₂)ᵣ—A²—(CH₂)ₛ—; R⁴ is a substituted C₃-C₁₂ alkyl, hydroxyalkyl, alkenyl, aryl or alkaryl group having p substitution sites; R⁵ is C₁-C₁₂ alkylene, hydroxyalkylene, alkenylene, arylene or alkarylene, or a C₂-C₃ oxyalkylene moiety having from 2 to about 20 oxyalkylene units provided that no O—O or O—N bonds are formed; X is a nonionic group selected from the group consisting of H, C₁-C₄ alkyl or hydroxyalkyl ester or ether groups, and mixtures thereof; L is a hydrophilic chain which contains the polyoxyalkylene moiety $-\!\!\left[(R^6O)_m(CH_2CH_2O)_n\right]\!\!-$; wherein R⁶ is C₃-C₄ alkylene or hydroxyalkylene and m and n are numbers such that the moiety —(CH₂CH₂O)— comprises at least about 50% by weight of said polyoxyalkylene moiety; d is 1 when M² is N⁺ and is 0 when M² is N; n is at least about 12 for said cationic monoamines, is at least about 6 for said cationic diamines and is at least about 3 for said cationic polyamines and cationic polymers; p is from 3 to 8; q is 1 or 0; and t is 1 or 0, provided that t is 1 when q is 1.

Other clay soil removal/anti-redeposition agents which can be used include the ethoxylated amine polymers disclosed in European patent application 111,984 to Eugene P. Gosselink, published June 27, 1984; the zwitterionic compounds disclosed in European patent application 111,976 to Donn N. Rubingh and Eugene P. Gosselink, published June 27, 1984; the zwitterionic polymers disclosed in European patent application 112,592 to Eugene P. Gosselink, published July 4, 1984; and the amine oxides disclosed in U.S. Pat. No. 4,548,744 to Connor, issued Oct. 22, 1985, all of which are incorporated by reference.

E. Other Optional Detergent Ingredients

Other optional ingredients which can be included in laundry detergent compositions of the present invention, in their conventional art-established levels for use (i.e., from 0 to about 20%), include solvents, bleaching agents, bleach activators, other soil-suspending agents, corrosion inhibitors, dyes, fillers, optical brighteners, germicides, pH adjusting agents (monoethanolamine, sodium carbonate, sodium hydroxide, etc.), enzymes, enzyme-stabilizing agents, perfumes, fabric softening components, static control agents, and the like.

F. General Detergent Formulations

Except for the previously described enrobing of the soil release compound, granular formulations embodying the laundry detergent compositions of the present invention can be formed by conventional techniques, i.e., by slurrying the individual components in water and then atomizing and spray-drying the resultant mixture, or by pan or drum granulation of the ingredients. Granular formulations preferably comprise from about 10 to about 30% detergent surfactant, and most preferably about 15 to about 25% surfactant. See also U.S. Pat. No. 4,569,772 to Ciallella, issued Feb. 11, 1986 and U.S. Pat. No. 4,571,303 to Ciallella, issued Feb. 18, 1986 (herein incorporated by reference), for methods of making built granular formulations containing nonionic detergent surfactants.

Liquid formulations embodying the laundry detergent compositions can be built or unbuilt. If unbuilt, these compositions conventionally contain approximately 15 to 50% (preferably 20 to 35%) total surfactant, from 0 to 5% (preferably from 0 to 2%) of an organic base such as a mono-, di-, or tri-alkanol amine, a neutralization system such as an alkali metal hydroxide and a lower primary alcohol such as ethanol or isopropanol, and approximately 20 to 80% water.

Built liquid laundry detergent compositions can be in the form of single phase liquids provided that the builder is solubilized in the mixture at its level of use. Such liquids conventionally contain 10 to 40% (preferably 15 to 25%) total surfactant, 1 to 25% (preferably 3 to 20%) builder which can be organic or inorganic, up to 10% of a hydrotrope system, and 20 to 80% water. Built liquid detergents incorporating components that form heterogeneous mixtures (or levels of builder that cannot be completely dissolved) can also comprise detergent compositions of the present invention. Such liquids conventionally employ viscosity modifiers to produce systems having plastic shear characteristics to maintain stable dispersions and to prevent phase separation or solid settlement. Care should also be taken to avoid exposing the soil release compounds to highly alkaline environments, e.g. those above a pH of about 8.5, during processing of the liquid detergent formulation.

While the laundry detergent compositions of the present invention are operative within a wide range of wash pHs, they are particularly suitable when formulated to provide a near neutral wash pH, i.e. an initial pH of from about 6.0 to about 8.5 at concentration of from about 0.1 to about 2% by weight in water at 20° C. Near neutral wash pH formulations are better for enzyme stability and for preventing stains from setting. The near neutral pH of such formulations is also desirable to insure long-term activity for the soil release compounds, especially those having shorter backbones. In such formulations, the product pH is preferably from about 6.5 to about 8.5, and more preferably from about 7.0 to about 8.0.

G. Specific Embodiments of Laundry Detergent Compositions According to the Present Invention

Embodiment I

A liquid detergent composition is formulated from the following ingredients:

| Ingredient | Wt. % |
| --- | --- |
| Polyester of Examples 1, 2, 3 or 4 | 1.0 |
| PEA$_{189}$E$_{17}$* | 1.5 |
| Sodium C$_{12}$ alkylethoxy (1) sulfate | 9.4 |
| C$_{12}$-C$_{13}$ alcohol polyethoxylate (6.5) | 21.5 |
| Ethanol | 7.3 |
| Sodium diethylenetriamine pentaacetate | 0.2 |
| MAXATASE | 0.026 Anson units/g |
| TERMAMYL | 0.51 KNu/g |
| Sodium formate | 1.6 |
| Calcium formate | 0.1 |
| Minors and water | Balance to 100 |

*Polyethyleneamine having M.W. of 189 and degree of ethoxylation of 17 at each reactive hydrogen.

The components are added together with continuous mixing to form the composition.

Embodiment II

A granular detergent composition is prepared from the following ingredients:

| Ingredient | Wt. % |
| --- | --- |
| Polyester of Examples 1, 2, 3 or 4* | 5.0 |
| C$_{12}$-C$_{13}$ alcohol polyethoxylate (6.5) | 20.0 |
| Magnesium sulfate | 1.0 |
| Zeolite 4A, hydrate | 26.0 |
| Sodium carbonate | 18.3 |
| Sodium bicarbonate | 15.7 |
| Bentolite L (fabric softening clay) | 3.0 |
| Fluorescent brightener | 1.7 |
| Maxase MP (proteolytic enzyme) | 1.5 |
| Dye | 0.1 |
| Water | Balance to 100 |

*Enrobed in PEG having an average M.W. 8,000.

The above components are formulated together according to Example 1 of U.S. Pat. No. 4,569,772, but with substitution of the enrobed polyester particles of the present invention in place of the stabilized PET-POET polymer of said patent.

LIQUID FABRIC SOFTENER COMPOSITIONS

A. Soil Release Component

The compounds of the present invention are also useful in aqueous fabric softener compositions to provide fabric softening and soil release properties when added during the rinse cycle.

The fabric softener compositions of the present invention comprise a soil release component which contains an effective amount of the soil release compounds previously defined. What is an "effective amount" will depend upon the particular soil release compounds used, the particular type of fabric softener formulation and the benefits desired. Usually, the soil release compounds are effective when included in an amount from about 0.01 to about 10% by weight of the composition. In terms of soil release benefits, preferred fabric softener compositions can comprise from about 0.1 to about 5% by weight of the soil release compounds, but typically comprise from about 0.3 to about 3% by weight of these compounds.

B. Fabric Softener Component

The fabric softener compositions of the present invention further comprise from about 2 to about 50% (preferably from about 3 to about 25%) by weight fabric softener component. For regular strength (1×) fabric softener compositions, the fabric softener component typically comprises from about 3 to about 10% by weight of the composition. For concentrated (e.g. 3X) fabric softener compositions, the fabric softener component typically comprises from about 15 to about 25% by weight of the composition.

This fabric softener component typically comprises a mono- or di(higher alkyl) quaternary ammonium salt or mixtures of such salts. See U.S. Pat. No. 3,928,213 to Temple et al., issued Dec. 23, 1975, especially column 2, line 57 to column 4, line 34, and U.S. Pat. No. 4,399,045 to Burns, issued Aug. 16, 1983, especially column 4, line 23 to column 7, line 2 (herein incorporated by reference), which disclose suitable quaternary ammonium salts. By "higher alkyl" as used in the context of the quaternary ammonium salts herein is meant alkyl groups having from 8 to 30 carbon atoms, preferably from 12 to 22 carbon atoms. Examples of such conventional quaternary ammonium salts include:

1. Mononitrogen quaternary ammonium salts having the formula:

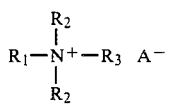

wherein $R_1$ is an aliphatic $C_{12}$-$C_{22}$ hydrocarbon group; $R_2$ is a $C_1$-$C_4$ saturated alkyl or hydroxyalkyl group, $R_3$ is selected from $R_1$ and $R_2$ and A is an anion such as chloride, bromide or methylsulfate.

Examples of suitable mononitrogen quaternary ammonium salts are tallow trimethyl ammonium chloride, ditallow dimethyl ammonium chloride, ditallow dimethyl ammonium methylsulfate, di(hydrogenated tallow) dimethyl ammonium chloride, dibehenyl dimethyl ammonium chloride, dihexadecyl dimethyl ammonium chloride, doctadecyl dimethyl ammonium chloride, dieicosyldimethylammonium chloride, didocosyl dimethyl ammonium chloride; di(hydrogenated tallow) dimethyl ammonium methyl sulfate; dihexadecyl diethyl ammonium chloride; ditallow dipropyl ammonium chloride; di(coconutalkyl) dimethyl ammonium chloride; and mixtures thereof;

2. Diamide quaternary ammonium salts having the formula:

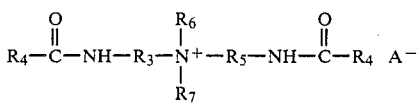

wherein $R_4$ is an aliphatic $C_{12}$-$C_{22}$ hydrocarbon group; $R_5$ is a divalent alkylene group having 1 to 3 carbon atoms; $R_6$ is a $C_1$-$C_4$ saturated alkyl or hydroxyalkyl group; $R_7$ is $R_6$ or the moiety $(C_aH_{2a}O)_bH$, wherein a is 2 or 3 and b is from 1 to about 5; and A is an anion.

Examples of suitable diamide quaternary ammonium salts are methylbis(tallowamidoethyl) (2-hydroxyethyl) ammonium methylsulfate, methylbis(hydrogenated tallowamidoethyl)(2-hydroxyethyl) ammonium methylsulfate, and bis(2-hydrogenated tallowamidoethyl) ethoxylated ammonium methyl sulfate; wherein $R_4$ is an aliphatic $C_{15}$-$C_{17}$ hydrocarbon group; $R_5$ is an ethylene group; $R_6$ is a methyl group, $R_7$ is a hydroxyalkyl or ethoxylate group and A is a methylsulfate anion; these materials are available from Sherex Chemical Company under the trade names Varisoft®222, Varisoft®220, and Varisoft®110;

3. Quaternary imidazolinium salts such as 1-methyl-1-tallowamido-ethyl-2-tallowimidazolinium methylsulfate (sold under the trade name Varisoft®475), 1-methyl-1-(hydrogenated tallowamidoethyl)-methylsulfate (sold under the trade name Varisoft 445®), 1-ethylene-bis(2-tallow-1-methyl-imidazolinium methylsulfate) (sold under the trade name Varisoft®6112); and 1-methyl-2-tallow-3[tallowamidoethyltallowamino)ethylene]imidazolinium methylsulfate (sold under the trade name Varisoft®3012).

For concentrated fabric softener compositions, a preferred fabric softener component comprises: (A) from about 2 to about 15% by weight mononitrogen quaternary ammonium salts; (B) from 0 to about 14% by weight diamide quaternary ammonium salts; (C) from about 2 to about 13% by weight quaternary imidalzolinium salts; the total amount of salts A, B and C being from about 15 to about 22.5% by weight. See U.S. Pat. No. 4,399,045 to Burns, issued Aug. 16, 1983, which is incorporated by reference.

The fabric softener component can also comprise certain di(higher alkyl) cyclic amines, typically as a mixture with a quaternary ammonium salt(s). These cyclic amines have the formula:

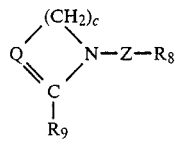

wherein c is 2 or 3, preferably 2; $R_8$ and $R_9$ are, independently, a $C_8$-$C_{30}$ alkyl or alkenyl group, preferably $C_{11}$-$C_{22}$ alkyl, more preferably $C_{15}$-$C_{18}$ alkyl, or mixtures of such alkyl radicals, such as those obtained from coconut oil, "soft" (non-hardened) tallow, and hardened tallow; Q is CH or N, preferably N; Z is

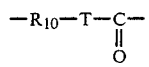

wherein T is O or $NR_{11}$, $R_{11}$ being H or $C_1$-$C_4$ alkyl, preferably H; and $R_{10}$ is a divalent $C_1$-$C_3$ alkylene or $(C_2H_4O)_d$ group, wherein d is a number of from 1 to 8, or Z is $R_{10}$.

Specific examples of such amines are as follows:
1-tallowamidoethyl-2-tallowimidazoline
1-(2-$C_{14}$-$C_{18}$-alkyl-amidoethyl)-2-$C_{13}$-$C_{17}$-alkyl-4,5-dihydro-imidazoline
1-stearylamidopropyl-2-stearylimidazoline
1-tallowamidobutyl-2-tallowpiperidine
2-coconutamidomethyl-2-laurylpyrimidine These amines and methods for their preparation are fully described in British Application 8508130, filed Mar. 28, 1985 by Koenig and De Buzzacarini which is herein incorporated by reference.

C. Optional Ingredients

1. Acids and Bases

When cyclic amines are present in the fabric softener component, the pH of the fabric softener composition is important for proper dispersion of the amines. Moreover, a moderately acidic pH is important for hydrolytic stability of the soil release compounds of the present invention. Therefore, acids and/or bases can be added to the composition to adjust its pH. The amount of acid or base should be such that the pH of the dispersion, after mixing, is in the range from about 3 to about 6.5.

Examples of suitable acids include the inorganic mineral acids, carboxylic acids, in particular the low molecular weight ($C_1$-$C_5$) carboxylic acids, and alkylsulfonic acids.

Suitable inorganic acids include HCl, $H_2SO_4$, $HNO_3$ and $H_3PO_4$. Suitable organic acids include formic, acetic, methanesulfonic and ethanesulfonic acid. Preferred acids are hydrochloric, phosphoric, formic and methane sulfonic acid.

Suitable bases include NaOH and $Na_2CO_3$.

2. Organic Solvent

The fabric softener compositions of the present invention can be formulated without the use of any organic solvent. However, the presence of organic solvents (for example, low molecular weight, water miscible aliphatic alcohols,) does not harm the storage stability, the viscosity, or the softening performance of the compositions. Examples of such solvents include ethanol and isopropanol.

Typically, the quaternary ammonium salt(s) (or cyclic amine) will be obtained from a supplier of bulk chemicals in solid form or as a solution in an organic solvent, e.g., isopropanol. There is no need to remove such a solvent in making the compositions. Indeed, additional solvent can be added, if this is deemed desirable.

3. Optional Nonionics

The fabric softener compositions optionally contain nonionics as have been disclosed for use in softener compositions. Such nonionics and their usage levels, have been disclosed in U.S. Pat. No. 4,454,049, to MacGilip et al., issued June 12, 1984, which is incorporated by reference.

Specific examples of nonionics suitable for the fabric softener compositions herein include glycerol esters (e.g., glycerol monostearate), fatty alcohols (e.g., stearyl alcohol), and alkoxylated fatty alcohols. The nonionic, if used, is typically used at a level in the range of from about 0.5 to about 10% by weight of the composition.

Although generally considered as having fabric softening properties, the nonionics are not considered part of the fabric softening component for the purposes of calculating the amount of fabric softening component in the composition.

4. Optional Silicone Component

The fabric softening composition optionally contains an aqueous emulsion of a predominantly linear polydialkyl or alkyl aryl siloxane in which the alkyl groups can have from one to five carbon atoms and can be wholly or partially fluorinated. Suitable silicones are polydimethyl siloxanes having a viscosity at 25° C. in the range from about 100 to about 100,000 centistokes, preferably in the range from about 1000 to about 12,000 centistokes.

It has been found that the ionic charge characteristics of the silicone as used in the combination are important in determining both the extent of deposition and the evenness of distribution of the silicone and hence the properties of a fabric treated therewith.

Silicones having cationic character show an enhanced tendency to deposit. Silicones found to be of value in providing fabric feel benefits have a predominantly linear character and are preferably polydialkyl siloxanes in which the alkyl group is most commonly methyl. Such silicone polymers are frequently manufactured commercially by emulsion polymerization using a strong acid or strong alkali catalyst in the presence of a nonionic or mixed nonionic-anionic emulsifier system.

The optional silicone component also embraces a silicone of cationic character which is defined as being one of (a) a predominantly linear di $C_1$-$C_5$ alkyl or $C_1$-alkyl, aryl siloxane, prepared by emulsion polymerization using a cationic surfactant as emulsifier;

(b) an alpha-omega-di quaternized di $C_1$-$C_5$ or $C_1$-$C_5$ alkyl, aryl siloxane polymer or (c) an amino-functional di ($C_1$-$C_5$ alkyl or alkyl aryl siloxane polymer in which the amino group may be substituted and may be quaternized and in which the degree of substitution (d.s.) lies in the range 0.0001 to 0.1, preferably 0.01 to 0.073;

provided that the viscosity at 25° C. of the silicone is from about 100 to about 100,000 cs.

The fabric softening compositions herein can contain up to about 10%, preferably from about 0.1% to about 5%, of the silicone component.

5. Other Optional Ingredients

In order to further improve the stability of the fabric softener compositions herein, and further adjust their viscosities, these compositions can contain relatively small amounts of electrolytes, such as NaCl, KBr, LiCl, $MgCl_2$ or $CaCl_2$.

The fabric softener compositions can also optionally contain other ingredients known to be suitable for use in textile softeners. Such adjuvents include perfumes, preservatives, germicides, colorants, dyes, fungicides, stabilizers, brighteners and opacifiers. These adjuvents, if used, are normally added at their conventional levels. However, in the case of composition ingredients utilized for a fabric treatment effect, e.g., perfumes, these materials can be added at higher than normal levels, corresponding to the degree of concentration of the product.

The balance of the fabric softener compositions of the present invention is water.

D. Specific Embodiments of Fabric Softener Compositions According to the Present Invention Embodiment I A fabric softener base composition is prepared from the following ingredients:

| Ingredient | Wt. % |
| --- | --- |
| Ditallow dimethyl ammonium chloride | 4.33 |
| 1-Methyl-1-tallowamidoethyl-2-tallowimidazolinium methylsulfate (Varisoft 475) | 1.0 |
| Ethanol | 0.7 |
| Isopropanol | 0.1 |
| Perfume | 0.42 |
| Dye | 0.1 |
| Minors* | up to 0.1 |
| Water | Balance |

*preservative, NaCl, NaOH, $H_2SO_4$, antioxidant solution.

To this base composition is added 1% by weight of the polyester of Examples 1, 2, 3 or 4.

Embodiments II–IV

Regular strength and concentrated fabric softener base compositions are prepared from the following ingredients:

| Ingredient | Wt. % I | II | III | IV |
|---|---|---|---|---|
| Ditallow dimethyl ammonium chloride | 3.65 | 7.7 | 2.33 | 7.0 |
| 1-Tallowamidoethyl-2-tallowimidazoline | 3.65 | 14.3 | 4.33 | 3.0 |
| Tallow trimethyl ammonium chloride | 0.5 | 0.5 | — | — |
| Polydimethyl siloxane (viscosity 5000 centistokes) | 0.2 | 0.6 | 1.33 | 4.0 |
| Perfume | 0.25 | 0.45 | 0.25 | 0.45 |
| Minors* | 0.13 | 0.13 | 0.13 | 0.13 |
| HCl | — | to pH 4 | — | — |
| Water | — | Balance | — | — |

*$CaCl_2$, dye, bactericide

To regular strength base compositions I and III are added 0.5% by weight of the polyester of Examples 1, 2, 3 or 4. To concentrated base compositions II and IV are added 2% by weight of the polyester of Examples 1, 2, 3 or 4.

Embodiment V

A concentrated fabric softener base composition is prepared from the following ingredients:

| Ingredient | Wt. % |
|---|---|
| Dihydrogenatedtallow dimethyl ammonium chloride | 13 |
| 1-Methyl-1-tallowamidoethyl-2-tallowimidazolinium methylsulfate (I.V. 42) | 3 |
| Polar Brilliant Blue dye | 80 ppm |
| $CaCl_2$ | 0.265 |
| Perfume | 0.75 |
| Ethanol | 0.92 |
| Isopropanol | 1.36 |
| Water | Balance |

To this concentrated base composition is added 3% by weight of the polyester of Examples 1, 2, 3 or 4.

DRYER-ADDED FABRIC CONDITIONING ARTICLES

A. Fabric Conditioning Component

The compounds of the present invention are further useful to provide soil release properties in a fabric conditioning component associated with dispensing means for release thereof in a dryer at operating temperatures. The term "fabric conditioning component" is defined as a mixture of the compounds of the present invention and a fabric softening agent defined hereafter. The compounds of the present invention can comprise from about 1 to about 70% of the fabric conditioning component. Preferably, the compounds of the present invention comprise from about 10 to about 70%, and most preferably from about 25 to about 50% by weight of the fabric conditioning component.

B. Fabric Softening Agent

The term "fabric softening agent" as used herein includes cationic and nonionic fabric softeners used alone and also in combination with each other. The preferred fabric softening agent of the present invention is a mixture of cationic and nonionic fabric softeners.

Examples of fabric softening agents are those described in U.S. Pat. No. 4,103,047, to Zaki et al., issued July 25, 1978; U.S. Pat. No. 4,237,155, to Kardouche, issued Dec. 2, 1980; U.S. Pat. No. 3,686,025 to Morton, issued Aug. 22, 1972; U.S. Pat. No. 3,849,435 to Diery et al., issued Nov. 19, 1974; and U.S. Pat. No. 4,037,996, to Bedenk, issued Feb. 14, 1978; all of which are incorporated by reference. Particularly preferred cationic fabric softeners of this type include quaternary ammonium salts such as dialkyl dimethylammonium chlorides, methylsulfates and ethylsulfates wherein the alkyl groups can be the same or different and contain from about 14 to about 22 carbon atoms. Examples of such preferred materials include ditallowalkyldimethylammonium methylsulfate, distearyldimethylammonium methylsulfate, dipalmityldimethylammonium methylsulfate and dibehenyldimethylammonium methylsulfate. Also, particularly preferred is the carboxylic acid salt of a tertiary alkylamine disclosed in said Kardouche patent. Examples include stearyldimethylammonium stearate, distearylmethylammonium myristate, stearyldimethylammonium palmitate, distearylmethylammonium palmitate, and distearylmethylammonium laurate. These carboxylic salts can be made in situ by mixing the corresponding amine and carboxylic acid in the molten fabric conditioning component.

Examples of nonionic fabric softeners are the sorbitan esters, described hereafter and $C_{12}$–$C_{26}$ fatty alcohols and fatty amines as described hereafter.

A preferred article includes a fabric conditioning component which comprises about 10 to about 70% of the soil release compounds of the present invention, and about 30 to about 90% of a fabric softening agent, the fabric softening agent being selected from cationic and nonionic fabric softeners, and mixtures thereof. Preferably, the fabric softening agent comprises a mixture of about 5 to about 80% of a cationic fabric softener and about 10 to about 85% of a nonionic fabric softener, by weight of the fabric conditioning component. The selection of the agents is such that the resulting fabric conditioning component has a melting point above about 38° C. and is flowable at dryer operating temperatures.

A preferred fabric softening agent comprises a mixture of $C_{10}$–$C_{26}$ alkyl sorbitan esters and mixtures thereof, a quaternary ammonium salt and a tertiary alkylamine. The quaternary ammonium salt is preferably present at a level of from about 5 to about 25%, more preferably present at a level of from about 7 to about 20% of the fabric conditioning component. The sorbitan ester is preferably present at a level of from about 10 to about 50%, more preferably from about 20 to about 40%, by weight of the total fabric conditioning component. The tertiary alkylamine is present at a level of from about 5% to about 25%, more preferably from 7% to about 20% by weight of the fabric conditioning component. The preferred sorbitan ester comprises a member selected from the group consisting of $C_{10}$–$C_{26}$ alkyl sorbitan monoesters and $C_{10}$–$C_{26}$ alkyl sorbitan di-esters, and ethoxylates of the esters wherein one or more of the unesterified hydroxyl groups in the esters contain from 1 to about 6 oxyethylene units, and mixtures thereof. The quaternary ammonium salt is preferably in the methylsulfate form. The preferred tertiary alkylamine is selected from the group consisting of alkyldimethylamine and dialkylmethylamine and mixtures thereof, wherein the alkyl groups can be the same or different and contain from about 14 to about 22 carbon atoms.

Another preferred fabric softening agent comprises a carboxylic acid salt of a tertiary alkylamine, in combination with a fatty alcohol and a quaternary ammonium salt. The carboxylic acid salt of a tertiary amine is used in the fabric conditioning component preferably at a level of from about 5 to about 50%, and more preferably, from about 15 to about 35%, by weight of the fabric conditioning component. The quaternary ammonium salt is used preferably at a level of from about 5 to about 25%, and more preferably, from about 7 to about 20%, by weight of the total fabric conditioning component. The fatty alcohol can be used preferably at a level of from about 10 to about 25%, and more preferably from about 10 to about 20%, by weight of the fabric conditioning component. The preferred quaternary ammonium salt is selected from the group consisting of dialkyl dimethylammonium salts wherein the alkyl groups can be the same or different and contain from about 14 to about 22 carbon atoms and wherein the counteranion is selected from the group consisting of chloride, methylsulfate and ethylsulfate, preferably methylsulfate. The preferred carboxylic acid salt of a tertiary alkylamine is selected from the group consisting of fatty acid salts of alkyldimethylamines wherein the alkyl group contains from about 14 to about 22 carbon atoms. The preferred fatty alcohol contains from about 14 to about 22 carbon atoms.

C. Optional Ingredients

Well known optional components can be included in the fabric conditioning component and are disclosed in U.S. Pat. No. 4,103,047 to Zaki et al., issued July 25, 1978, for "Fabric Treatment Compositions", (herein incorporated by reference).

D. Dispensing Means

The fabric conditioning component can be employed by simply adding a measured amount into the dryer, e.g., as liquid dispersion. However, in a preferred embodiment, the fabric conditioners are provided as an article in combination with a dispensing means such as a flexible substrate which effectively releases the component in an automatic clothes dryer. Such dispensing means can be designed for single usage or for multiple uses.

One such article comprises a sponge material releasably enclosing enough fabric conditioning component to effectively impart fabric soil release and softness benefits during several cycles of clothes. This multi-use article can be made by filling a hollow sponge with about 20 grams of the fabric conditioning component.

Other devices and articles suitable for dispensing the fabric conditioning composition into automatic dryers include those described in U.S. Pat. No. 4,103,047 to Zaki et al., issued July 25, 1978; U.S. Pat. No. 3,736,668 to Dillarstone, issued June 5, 1973; U.S. Pat. No. 3,701,202 to Compa et al., issued Oct. 31, 1972; U.S. Pat. No. 3,634,947 to Furgal, issued Jan. 18, 1972; U.S. Pat. No. 3,633,538 to Hoeflin, issued Jan. 11, 1972; and U.S. Pat. No. 3,435,537 to Rumsey, issued Apr. 1, 1969. All of these patents are incorporated by reference.

A highly preferred article herein comprises the fabric conditioning component releasably affixed to a flexible substrate in a sheet configuration. Highly preferred paper, woven or nonwoven "absorbent" substrates useful herein are fully disclosed in U.S. Pat. No. 3,686,025, to Morton, issued Aug. 22, 1972, herein incorporated by reference. It is known that most substances are able to absorb a liquid substance to some degree; however, the term "absorbent" as used herein, is intended to mean a substance with an absorbent capacity (i.e., a parameter representing a substrate's ability to take up and retain a liquid) from 4 to about 12, preferably about 5 to about 7, times its weight of water.

Determination of absorbent capacity values is made by using the capacity testing procedures described in U.S. Federal Specifications UU-T-595b, modified as follows:

1. tap water is used instead of distilled water;
2. the specimen is immersed for 30 seconds instead of 3 minutes;
3. draining time is 15 seconds instead of 1 minute; and
4. the specimen is immediately weighed on a torsion balance having a pan with turned-up edges.

Absorbent capacity values are then calculated in accordance with the formula given in said Specification. Based on this test, one-ply, dense bleached paper (e.g., kraft or bond having a basis weight of about 32 pounds per 3,000 square feet) has an absorbent capacity of 3.5 to 4, commercially available household one-ply toweling paper has a value of 5 to 6; and commercially available two-ply household toweling paper has a value of 7 to about 9.5.

Using a substrate with an absorbent capacity of less than 4 tends to cause too rapid release of the fabric conditioning component from the substrate resulting in several disadvantages, one of which is uneven conditioning of the fabrics. Using a substrate with an absorbent capacity over 12 is undesirable, inasmuch as too little of the fabric conditioning component is released to condition the fabrics in optimal fashion during a normal drying cycle.

Such a substrate comprises a nonwoven cloth having an absorbent capacity of preferably from about 5 to about 7 and wherein the weight ratio of fabric conditioning component to substrate on a dry weight basis ranges from about 5:1 to about 1:1.

Nonwoven cloth substrate preferably comprises cellulosic fibers having a length of from 3/16 inch to 2 inches and a denier of from 1.5 to 5 and the substrate is adhesively bonded together with a binder resin.

The flexible substrate preferably has openings sufficient in size and number to reduce restriction by said article of the flow of air through an automatic laundry dryer. The better openings comprise a plurality of rectilinear slits extended along one dimension of the substrate.

E. Usage

The method for imparting the above-described fabric conditioning component to provide soil release, softening and antistatic effects to fabrics in a automatic laundry dryer comprises: commingling pieces of damp fabrics by tumbling the fabrics under heat is an automatic clothes dryer with an effective amount of the fabric conditioning component, the component having a melting point greater than about 38° C. and being flowable at dryer operating temperature, the component comprising from about 1 to about 70% of the soil release compounds of the present invention, and about 30 to about 99% of a fabric softening agent selected from the above-defined cationic and nonionic fabric softeners and mixtures thereof.

The method herein is carried out in the following manner: damp fabrics, usually containing from about 1 to about 1.5 times their weight of water, are placed in the drum of an automatic clothes dryer. In practice, such damp fabrics are commonly obtained by laundering, rinsing and spin-drying the fabrics in a standard washing machine. The fabric conditioning component can simply be spread uniformly over all fabric surfaces, for example, by sprinkling the component onto the fabrics from a shaker device. Alternatively, the component can be sprayed or otherwise coated on the dryer drum, itself. The dryer is then operated in standard fashion to dry the fabrics, usually at a temperature from about 50° C. to about 80° C. for a period from about 10 minutes to about 60 minutes, depending on the fabric load and type. On removal from the dryer, the dried fabrics have been treated for soil release benefits and are softened. Moreover, the fabrics instantaneously sorb a minute quantity of water which increases the electrical conductivity of the fabric surfaces, thereby quickly and effectively dissipating static charge.

In a preferred mode the present process is carried out by fashioning an article comprising the substrate-like dispensing means of the type hereinabove described in releasable combination with a fabric conditioning component. This article is simply added to a clothes dryer together with the damp fabrics to be treated. The heat and tumbling action of the revolving dryer drum evenly distributes the fabric conditioning component over all fabric surfaces, and dries the fabrics.

F. Specific Embodiments of Dryer-Added Fabric Conditioning Articles

The fabric conditioning component of the articles is formulated from the following ingredients.

| Ingredient | Wt. % A | Wt. % B |
|---|---|---|
| Soil Release Compound[a] | 37.5 | 67.0 |
| Fabric Softening Agents | | |
| DTDMAMS[b] | 11.25 | — |
| DTMA[c] | 11.25 | — |
| SMS[d] | 22.5 | 33.0 |
| $C_{16}$-$C_{18}$ Fatty Alcohol | 12.5 | — |
| Clay[e] | 5.0 | — |

[a]Polyester of Examples 1, 2, 3 or 4
[b]Ditallowdimethylammonium methyl sulfate
[c]Ditallowmethyl amine
[d]Sorbitan monostearate
[e]Bentolite L sold by Southern Clay Products The ingredients in Embodiments A and B are admixed and liquified at 70° C. Each nonwoven substrate, comprised of 70% 3-denier, 1-9/16" long rayon fibers with 30% polyvinyl acetate binder, is cut into a 9" by 11" sheet. Slightly more than target coating weight is distributed on a heating plate and the nonwoven cloth is placed over it. A small paint roller is used to impregnate the mixture into the interstices of the substrate. The article is removed from the hot plate and allowed to cool to room temperature whereby the mixture solidifies. Following solidification of the fabric conditioning component, the cloth is slit with a knife. (Conveniently, the cloth is provided with 3 to 9 rectilinear slits extending along one dimension of the substrate, the slits being in substantially parallel relationship and extending to within about 1" from at least one edge of said dimension of the substrate). The width of an individual slit is about 0.2".

What is claimed is:

1. A capped, substituted-ethylene terephthalate ester compound having oligomeric or polymeric backbone incorporating particular polyoxyethylene moieties, said compound having the formula:

$$X-(OCH_2CH(Y))_n(OR^4)_m[(A-R^1-A-R^2-)_u(A-R^1-A-R^3)_v]$$
$$-A-R^1-A-(R^4O)_m(CH(Y)CH_2O)_{\overline{n}}X$$

wherein the A moieties are selected from the group consisting of

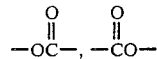

and combinations thereof with either or both of the moieties

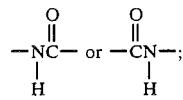

the $R^1$ moieties are selected from 1,4-phenylene moieties and combinations thereof with up to 50% of other arylene or alkarylene moieties, alkylene moieties, alkenylene moieties or mixtures thereof; the $R^2$ moieties are selected from (a) the group consisting of 1,2-propylene, 1,2-butylene, 3-methoxy-1,2-propylene and combinations thereof, and (b) combinations of the foregoing $R^2$ moieties with up to 20% of other compatible $R^2$ moieties; the $R^3$ moieties are selected from moieties $(CH_2CH_2O)_q-CH_2CH_2-$ wherein q is at least about 9, and from combinations thereof with up to 50% of other compatible $R^3$ moieties; each $R^4$ is $C_3$-$C_4$ alkylene, or the moiety $-R^2-A-R^5-$, wherein $R^5$ is a $C_1$-$C_{12}$ alkylene, alkenylene, arylene or alkarylene moiety; the Y substituents of each moiety $+(R^4O)_m(CH(Y)CH_2O)_{\overline{n}}$ are H, the ether moiety $-CH_2(OCH_2CH_2)_pO-X$ or a mixture of said ether moiety and H; each X is H, $C_1$-$C_4$ alkyl or

wherein $R^6$ is $C_1$-$C_4$ alkyl; m and n are numbers such that the moiety $-(CH(Y)CH_2O)-$ comprises at least about 50% by weight of the moiety $+(R^5O)_m(CH(Y)CH_2O)_{\overline{n}}$, provided that when $R^4$ is the moiety $-R^2-A-R^5-$, m is 1; each n is at least about 6; p is 0 or at least 1; the average value of u is from about 2 to about 50; the average value of v is from about 1 to about 20; the average value of u+v is from about 3 to about 70.

2. The compound of claim 1, wherein each A is

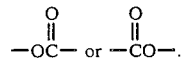

3. The compound of claim 2, wherein each $R^1$ moiety is a 1,4-phenylene moiety.

4. The compound of claim 2 wherein the ratio of u to v is at least about 1.

5. The compound of claim 4 wherein said $R^2$ moieties are 1,2-propylene moieties.

6. The compound of claim 5 wherein said polyoxyethylene moieties comprise from about 90 to 100% of said $R^3$ moieties.

7. The compound of claim 6 wherein q is from about 12 to about 90.

8. The compound of claim 7 wherein the Y substituents are all H.

9. The compound of claim 8, wherein m is 0 and each n is from about 12 to about 113.

10. A laundry detergent composition, which comprises
   (a) from about 5 to about 75% by weight of a nonionic detergent surfactant;
   (b) from 0 to about 15% by weight synthetic anionic detergent surfactants; and
   (c) a soil release component having an effective amount of the compound of claim 1.

11. The composition of claim 10, wherein said compound comprises from about 0.01 to about 10% by weight of the composition.

12. The composition of claim 11, wherein said compound comprises from about 0.1 to about 5% by weight of the composition.

13. The composition of claim 12, wherein said nonionic detergent surfactant comprises from about 15 to about 30% by weight of the composition and wherein said anionic detergent surfactant comprises from 0 to about 10% by weight of the composition.

14. The composition of claim 13, which is in liquid form.

15. The composition of claim 14, which further comprises an optical brightener.

16. An aqueous fabric softener composition, which comprises:
   (a) from about 2 to about 50% by weight of a fabric softener component; and
   (b) a soil release component having an effective amount of the compound of claim 1.

17. The composition of claim 16, wherein said compound comprises from about 0.01 to about 10% by weight of the composition.

18. The composition of claim 17, wherein said fabric softener component comprises a quaternary ammonium salt selected from the group consisting of:
   (1) mononitrogen quaternary ammonium salts having the formula:

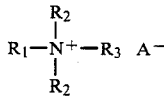

wherein $R_1$ is an aliphatic $C_{12}$–$C_{22}$ hydrocarbon group; $R_2$ is a $C_1$–$C_4$ saturated alkyl or hydroxyalkyl group; $R_3$ is selected from $R_1$ and $R_2$; and A is an anion;

(2) diamide quaternary ammonium salts having the formula:

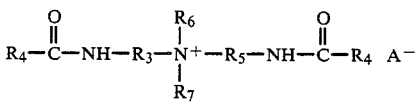

wherein $R_4$ is an aliphatic $C_{12}$–$C_{22}$ hydrocarbon group; $R_5$ is a divalent alkylene group having 1 to 3 carbon atoms; $R_6$ is a $C_1$–$C_4$ saturated alkyl or hydroxyalkyl group; $R_7$ is $R_6$ or the moiety $(C_aH_{2a}O)_bH$, wherein a is 2 or 3 and b is from 1 to about 5; and A is an anion;

(3) quaternary imidazolinium salts selected from the group consisting of 1-methyl-1-tallowamidoethyl-2-tallowimidazolinium methylsulfate, 1-methyl-1-(hydrogenated tallowamidoethyl)methylsulfate, 1-ethylene-bis(2-tallow-1-methyl-imidazolinium methylsulfate); and 1-methyl-2-tallow-3[tallowamidoethyltallowamino)ethylene]-imidazolinium methylsulfate;
   (4) and mixtures thereof.

19. A composition according to claim 18 wherein said fabric softener component further comprises a cyclic amine having the formula:

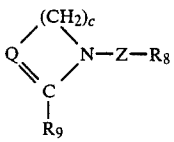

wherein c is 2 or 3; $R_8$ and $R_9$ are, independently, a $C_8$–$C_{30}$ alkyl or alkenyl group, Q is CH or N, Z is $R_{10}$ or

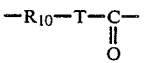

wherein T is 0 or $NR_{11}$, $R_{11}$ is H or $C_1$–$C_4$ alkyl; and $R_{10}$ is a divalent $C_1$–$C_3$ alkylene or $(C_2H_4O)_d$ group; wherein d is a number of from 1 to 8.

20. The composition of claim 18, wherein said fabric softener component comprises from about 3 to about 10% by weight of the composition.

21. A composition according to claim 18, wherein said fabric softener component comprises from about 15 to about 25% by weight of the composition.

22. A composition according to claim 21, wherein said fabric softener component comprises: (A) from about 2 to about 15% by weight of said mononitrogen quaternary ammonium salts; (B) from 0 to about 14% by weight said diamide quaternary ammonium salts; (C) from about 2 to about 13% by weight of said quaternary imidazolimium salts; the total amount of said salts being from about 15 to about 22.5% by weight of the composition.

23. An article which provides fabric soil release and softening benefits when used within an automatic clothes dryer, which comprises:
   (a) a fabric conditioning component having a melting point above about 38° C. and being flowable at dryer operating temperatures and which comprises:
      (i) from about 1 to about 70% of the compound of claim 1; and
      (ii) from about 30 to about 99% of a fabric softening agent selected from the group consisting of cationic fabric softener compounds, nonionic fabric softener compounds and mixtures thereof;
   (b) said fabric conditioning component being associated with a dispensing means which provides for release thereof within an automatic clothes dryer at dryer operating temperatures.

24. The article of claim 23 wherein said dispensing means comprises a flexible substrate in sheet configuration having said fabric conditioning component releasably affixed thereto to provide a weight ratio of fabric conditioning component to dry substrate of from about 10:1 to about 0.5:1.

25. The article of claim 24 wherein said compound is present at a level of from about 10 to about 70% by weight of the fabric conditioning component.

26. The article of claim 25 wherein said fabric softening agent comprises a mixture of from about 5 to about 80% of a cationic fabric softener and from about 10 to about 85% of a nonionic fabric softener, by weight of said fabric conditioning component.

27. The article of claim 26 wherein said cationic fabric softener is selected from the group consisting of:
  (1) a quaternary ammonium salt; and
  (2) a carboxylic acid salt of a tertiary alkylamine; and mixtures of (1) and (2);
    and wherein said nonionic fabric softener is selected from the group consisting of:
  (3) a fatty alkyl sorbitan ester;
  (4) a fatty alcohol; and
  (5) a fatty amine;
    and binary and ternary mixtures of (3), (4) and (5).

28. The article of claim 27 wherein said fabric softening component comprises a mixture of from about 5 to about 25% of a quaternary ammonium salt, from about 10 to about 50% of a sorbitan ester, and from about 5 to about 25% of a fatty amine.

29. A capped, 1,2-propylene terephthalate ester compound having oligomeric or polymeric backbone incorporating polyoxyethylene moieties, said compound having the formula:

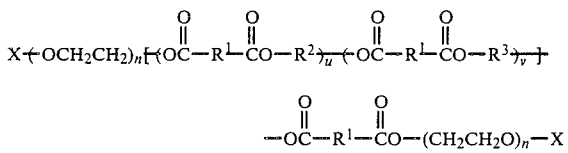

wherein each $R^1$ is a 1,4-phenylene moiety; the $R^2$ moieties are 1,2-propylene moieties; the $R^3$ moieties are the polyoxyethylene moieties $-(CH_2CH_2O)_q-CH_2CH_2-$; each X is ethyl or methyl; each n is from about 12 to about 45; q is from about 12 to about 90; the average value of u is from about 5 to about 20; the average value of v is from about 1 to about 10; the average value of $u+v$ is from about 6 to about 30; the ratio u to v is from about 1 to about 6.

30. A laundry detergent composition, which comprises:
  (a) from about 15 to about 30% by weight of a nonionic detergent surfactant;
  (b) from 0 to about 10% by weight synthetic anionic detergent surfactants; and
  (c) from about 0.1 to about 5% by weight of the compound claim 29.

31. An aqueous fabric softener composition, which comprises:
  (a) from about 3 to about 25% by weight of a fabric softener component; and
  (b) from about 0.1 to about 5% by weight of the compound of claim 29.

32. An article which provides fabric soil release and softening benefits when used within an automatic clothes dryer, which comprises:
  (a) a fabric conditioning component having a melting point above about 38° C. and being flowable at dryer operating temperatures and which comprises:
    (i) from about 10 to about 70% of the compound of claim 29; and
    (ii) from about 30 to about 90% of a fabric softening agent selected from the group consisting of cationic fabric softener compounds, non-ionic fabric softener compounds and mixtures thereof;
  (b) said fabric conditioning component being associated with a flexible substrate which provides for release thereof within an automatic clothes dryer at dryer operating temperatures.

33. A method for imparting an improved combination of soil release, softening and anti-static effects to fabrics in an automatic laundry dryer which comprises the step of: commingling pieces of damp fabrics by tumbling the fabrics under heat in an automatic clothes dryer with a flexible substrate having releasably affixed thereto an effective amount of a fabric conditioning component having a melting point greater than about 38° C. and being flowable at dryer operating temperature, the fabric conditioning component comprising from about 10 to 70% of the compound of claim 29, and 30 to 90% of a fabric softening agent.

* * * * *

UNITED STATES PATENT AND TRADEMARK OFFICE
CERTIFICATE OF CORRECTION

PATENT NO. : 4,711,730
DATED : December 8, 1987
INVENTOR(S) : Gosselink et al

It is certified that error appears in the above-identified patent and that said Letters Patent is hereby corrected as shown below:

Column 4, line 41, that portion of the moiety reading "$R^5$" should read -- $R^4$ --.

Column 6, line 33, the word "st" should read -- at --.

Column 7, line 62, the moiety reading "$-(CH_2CH_2O)_q-CH_2CH_2 13$" should read -- $-(CH_2CH_2O)_q-CH_2CH_2-$ --.

Column 8, line 45, that portion of the moiety reading "$R^5$" should read -- $R^4$ --.

Column 8, line 66, delete "and $-(CH_2CH_2O)_{n2}-$".

Column 11, line 7, the number "286" should read -- 268 --.

Column 16, line 53, that portion reading "2.6" should read -- 2.7 --.

Column 36, line 51, in Claim 1, that portion of the moiety reading "$R^5$" should read -- $R^4$ --.

Signed and Sealed this

Eleventh Day of February, 1992

Attest:

HARRY F. MANBECK, JR.

Attesting Officer

Commissioner of Patents and Trademarks